(12) United States Patent
Shimazaki et al.

(10) Patent No.: US 7,917,000 B2
(45) Date of Patent: Mar. 29, 2011

(54) VIDEO RECORDING APPARATUS, MULTIPLEXING METHOD, PICTURE ENCODING METHOD, PROGRAM, AND RECORDING MEDIUM FOR VARIABLE FRAME-RATE RECORDING

(75) Inventors: Hiroaki Shimazaki, Osaka (JP); Hideaki Mita, Hyogo (JP); Hiroshi Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 998 days.

(21) Appl. No.: 11/093,826

(22) Filed: Mar. 30, 2005

(65) Prior Publication Data

US 2005/0232597 A1 Oct. 20, 2005

(30) Foreign Application Priority Data

Mar. 31, 2004 (JP) .................. 2004-103760
Oct. 27, 2004 (JP) .................. 2004-312899

(51) Int. Cl.
*H04N 5/77* (2006.01)
(52) U.S. Cl. ..................... 386/224
(58) Field of Classification Search .......... 386/68, 386/95
See application file for complete search history.

(56) References Cited

U.S. PATENT DOCUMENTS

| | | | | |
|---|---|---|---|---|
| 6,058,141 A * | 5/2000 | Barger et al. | ............. | 375/240 |
| 6,744,815 B1 * | 6/2004 | Sackstein et al. | ............. | 375/240 |
| 2001/0055469 A1 | 12/2001 | Shida et al. | | |
| 2002/0021364 A1 | 2/2002 | Asada et al. | | |
| 2002/0041754 A1 | 4/2002 | Kikuchi et al. | | |
| 2002/0118953 A1 | 8/2002 | Kim | | |
| 2004/0081437 A1 | 4/2004 | Asada et al. | | |
| 2004/0126097 A1 * | 7/2004 | Aridome | ............. | 386/98 |
| 2006/0233244 A1 * | 10/2006 | Lee et al. | ............. | 375/240.12 |

FOREIGN PATENT DOCUMENTS

| | | |
|---|---|---|
| CN | 1221284 A | 6/1999 |
| CN | 200910138032.7 | 4/2010 |
| CN | 200910138033.1 | 7/2010 |
| EP | 1 049 332 A2 | 11/2000 |
| JP | 2000-312340 A | 11/2000 |
| JP | 2001/010204 | 1/2002 |
| JP | 2002/010129 | 1/2002 |
| JP | 2002-094939 A | 3/2002 |
| JP | 2002-152569 A | 5/2002 |
| JP | 2002-320203 A | 10/2002 |
| JP | 2003-018547 A | 1/2003 |
| JP | 2009-152853 | 11/2010 |
| WO | WO 02/39737 A1 | 5/2002 |

OTHER PUBLICATIONS

"Technique Called 'Variable Frame Rate Function'" Shashin-Kogyou Publishing Inc. by Katsuyuki Taguchi and Minoru Namikawa, "video α", Apr. 2003, vol. 19/No. 4, Serial No. 180.

* cited by examiner

*Primary Examiner* — Peter-Anthony Pappas
*Assistant Examiner* — Asher Khan
(74) *Attorney, Agent, or Firm* — RatnerPrestia

(57) ABSTRACT

A video recording apparatus provides a slow motion effect or a quick motion effect by digitally converting the frame-rate instead of by changing the playback speed of the film, and using few recording media without requiring any special device at playing. A picture encoding part encodes only valid frames by changing a rate-controlling method so that a predetermined playing frame-rate is obtained at a standard data-rate at playing. And a TS multiplexing part multiplexes by converting a frequency of a standard STC clock by only a ratio of valid frame-rate and playing frame-rate, and generating values for PCR, PTS, and DTS.

4 Claims, 17 Drawing Sheets

VIDEO RECORDING APPARATUS, MULTIPLEXING METHOD, PICTURE ENCODING METHOD, PROGRAM, AND RECORDING MEDIUM FOR VARIABLE FRAME-RATE RECORDING

BACKGROUND OF THE INVENTION

1. Field of the Invention

The present invention relates to a video recording apparatus such as a video camera, and more specifically to a video recording apparatus suitable for providing a slow motion effect or a quick motion effect in a movie by digitally, instead of using a film, converting the frame-rate, and a multiplexing method, a picture encoding method, a program, and a recording medium used for configuring the video recording apparatus.

2. Related Art of the Invention

Conventionally, movies have been taken and edited with a film. Conventional film based video recording apparatus provides a slow motion effect or a quick motion effect in a movie by changing a recording frame-rate with fast forwarding or slow playing of the film.

The advance of semiconductor technology, computer technology, and high-density recording technology has boosted picture quality and performance of a broadcasting apparatus system. Now, more and more movies are being produced with a digital cinema system using a VTR and a computer-based non-linear editing facility. Such new methods include a method for digitally providing a slow motion effect and a quick motion effect with a multi-frame-rate capable imaging device that can set a frame-rate at imaging to any value by controlling a CCD (Charge Coupled Device) driving method in an imaging part.

For example, "TECHNIQUE CALLED 'VARIABLE FRAME RATE FUNCTION'" Shashin-Kogyou Publishing Inc. by Katsuyuki Taguchi and Minoru Namikawa, "video α" 2003, April, vol. 19/No. 4, serial number 180 describes a VTR that can digitally provide a slow motion effect and a quick motion effect with a multi-frame-rate capable imaging device. This device can vary a frame-rate by one frame/second from four frames/second to 60 frames/second to progressively drive a CCD. For simplicity, an imaging frame-rate is X frames/second and a picture signal output from a CCD is called an Xp picture signal in the description later. Although a frame-rate can vary by one frame/second in the example of "TECHNIQUE CALLED 'VARIABLE FRAME RATE FUNCTION'", X needs not be an integer and can be set any number in the range of real numbers.

A CCD output is Xp picture signals. The signals varied to 60 frames/second by so-called pull-down process, which repeats each frame for once or more times, is recorded as 60p picture signals in VTR part included in a multi-frame-rate capable imaging device. A VTR using so-called intra-frame compression, in which compression is completed for each frame, is used for a VTR here so as to retrieve any frame in compressed video data.

That is to say, the multi-frame-rate capable imaging device is provided with a view-finder including a liquid crystal panel called EVF (Electronic View Finder). The EVF can typically display only 60p picture signals and cannot display picture signals at the frame-rate as it shot, for example, at 12 frames/second. Xp picture signals have to be subjected to a pull-down process to be 60p picture signals, which can be displayed on EVF, so that EVF can display Xp picture signals of a CCD output display. 60p picture signals resulted from the pull-down process is recorded on a VTR.

At playing, 60p picture signals resulted from the pull-down process is played from the tape. Conventional video recording apparatus provide a slow motion effect and a quick motion effect by retrieving Xp picture signals, the signals before the pull-down process, from the 60p picture signals and changing its time axis to make the frame-rate 24 frames/second with a special device called "frame-rate converter", and recording the signals as 24p picture signals in a VTR for editing.

SUMMARY OF THE INVENTION

However, conventional video recording apparatus consumed quite many recording media as they records 60p picture signals resulted from a pull-down process in a VTR, which uses intra-frame compression, where they only need to record Xp picture signals.

In addition, a special device called "frame-rate converter" is required to perform retrieval of Xp picture signals and time axis conversion to make 24p picture signals after playing from a VTR.

The present invention intends to provide a video recording apparatus, a multiplexing method, a picture encoding method, a program, and a recording medium for consuming a few recording media without requiring any special device at playing in view of the above mentioned problems.

In order to solve the above problems, the $1^{st}$ aspect of the present invention is a video recording apparatus comprising:
a multiplexing device operable to multiplex time management information defining times for decoding and compressed picture data generated by performing compression encoding of input picture signals and operable to output a system stream; and
a recording device operable to record the system stream on a recording medium;
wherein, when a recording frame-rate of the input picture signals is different from a preset playing frame-rate for playing picture signals obtained after recording, playing, and decoding the system stream, said multiplexing device multiplexes the time management information corresponding to the preset playing frame-rate and the compressed picture data.

The $2^{nd}$ aspect of the present invention is the video recording apparatus according to the $1^{st}$ aspect of the present invention, comprising a picture encoding device operable to perform compression encoding of the input picture signals and output the compressed picture data.

The $3^{rd}$ aspect of the present invention is the video recording apparatus according to the $1^{st}$ aspect of the present invention, wherein the compressed picture data is generated by performing interframe compression on some frames of the input picture signals.

The $4^{th}$ aspect of the present invention is the video recording apparatus according to the $1^{st}$ aspect of the present invention, wherein the compressed picture data is generated from the input picture signals obtained from an imaging device that can vary a frame-rate during imaging.

The $5^{th}$ aspect of the present invention is the video recording apparatus according to the $1^{st}$ aspect of the present invention, wherein said multiplexing device is operable to perform multiplexing complying with an MPEG standard, and wherein the time management information includes PCR or SCR used as a timing reference for decoding and outputting (displaying), wherein PTS indicates a timing for outputting each decoded frame, and DTS indicates a timing for decoding.

The $6^{th}$ aspect of the present invention is the video recording apparatus according to the $1^{st}$ aspect of the present invention, wherein said multiplexing device has a clock operable to generate the time management information, said clock having a frequency which can be varied from a reference value used when the recording frame-rate and the playing frame-rate are the same; and wherein when the recording frame-rate is different from the playing frame-rate, said multiplexing device changes a frequency of said clock from the reference value and uses the changed frequency to generate the time management information.

The 7th aspect of the present invention is the video recording apparatus according to the 6th aspect of the present invention, wherein, when the recording frame-rate is X frames/second (X is a real number) and the playing frame-rate is Y frames/second, said multiplexing device changes a frequency of said clock to X/Y times the reference value when X and Y are the same and uses the changed frequency to generate the time management information.

The 8th aspect of the present invention is the video recording apparatus according to the 1st aspect of the present invention, wherein, when the recording frame-rate is X frames/second (X is an real number) and the playing frame-rate is Y frames/second, said multiplexing device calculates the time management information so that a difference of values between pieces of the time management information is X/Y times a difference of values between corresponding pieces of the reference time management information, wherein time management information generated when X and Y are the same is the reference time management information.

The 9th aspect of the present invention is the video recording apparatus according to the 1st aspect of the present invention, wherein, when the recording frame-rate is different from the playing frame-rate, said multiplexing device generates the timing reference information with an interval for multiplexing different from a reference interval for multiplexing, wherein the reference interval for multiplexing is an interval for multiplexing in case the recording frame-rate and the playing frame-rate are the same, for timing reference information (PCR) among the time management information.

The 10th aspect of the present invention is the video recording apparatus according to the 9th aspect of the present invention, wherein, when the recording frame-rate is X frames/second (X is an real number) and the playing frame-rate is Y frames/second, said multiplexing device generates timing reference information so that the timing reference information (PCR) among the time management information is X/Y times a reference interval for multiplexing, wherein the reference interval for multiplexing is an interval for multiplexing in case X and Y are the same.

The 11th aspect of the present invention is a video recording apparatus comprising:

a picture encoding device operable to perform compression encoding of input picture signals and output the compressed picture data;

a multiplexing device operable to multiplex other information and the compressed picture data and output a system stream; and a recording device operable to record the system stream on a recording medium;

wherein said picture encoding device is operable to change a recording data-rate of the compressed picture data from a reference data-rate and perform compression encoding of the input picture signals when a recording frame-rate is different from a playing frame-rate, wherein the reference data-rate is a playing data-rate of the compressed image data when a recording frame-rate of the input picture signals and a playing frame-rate preset in playing picture signals obtained after recording, playing, and decoding the system stream are the same.

The 12th aspect of the present invention is the video recording apparatus according to the 11th aspect of the present invention, wherein, when the recording frame-rate is different from the playing frame-rate, said picture encoding device performs compression encoding of the input picture signals so that data-rate during playing of the compressed picture data approximately matches the reference data-rate.

The 13th aspect of the present invention is the video recording apparatus according to the 12th aspect of the present invention, wherein, when the recording frame-rate is X frames/second (X is a real number), the playing frame-rate is Y frames/second, and the reference data-rate is R bits/second (R is a real number), said picture encoding device performs rate-controlling so that the input picture signals are subjected to compression encoding at a data-rate of R×(X/Y) bits/second.

The 14th aspect of the present invention is the video recording apparatus according to the 13th aspect of the present invention, wherein the system stream is a stream complying with an MPEG2 standard; and wherein said picture encoding device is operable to set a picture_rate indicating an input picture frame-rate for rate-controlling to X and a bit_rate indicating a target rate of compressed picture data to R×(X/Y), respectively.

The 15th aspect of the present invention is the video recording apparatus according to the 12th aspect of the present invention, wherein, when the recording frame-rate is X frames/second (X is a real number), the playing frame-rate is Y frames/second, and the reference data-rate is R bits/second (R is a real number), said picture encoding device performs rate-controlling so as to perform compression encoding of picture signals whose frame-rate is Y at a data-rate of R bits/second regardless of a frame-rate of the input picture signals being X.

The 16th aspect of the present invention is the video recording apparatus according to the 15th aspect of the present invention, wherein the system stream is a stream complying with an MPEG2 standard; and wherein said picture encoding device is operable to set a picture_rate indicating an input picture frame-rate for rate-controlling to Y and a bit_rate indicating a target rate of compressed picture data to R, respectively.

The 17th aspect of the present invention is the video recording apparatus according to the 11th aspect of the present invention, wherein, when the recording frame-rate is different from the playing frame-rate, said picture encoding device changes a data-rate of the compressed picture data during playing, which corresponds to the playing frame-rate, based on the recording frame-rate.

The 18th aspect of the present invention is a video recording apparatus comprising:

a multiplexing device operable to multiplex other information and compressed picture data generated by performing compression encoding on picture signals and output a system stream; and a recording device operable to record the system stream on a recording medium;

wherein said multiplexing device is operable to change a recording system data-rate of the system stream from a reference data-rate and perform multiplexing when a recording frame-rate is different from a playing frame-rate, wherein the reference system data-rate is a playing data-rate of the system stream when a recording frame-rate of the input picture data and a preset playing frame-rate of playing picture signals obtained after recording, playing, and decoding of the system stream are the same.

The 19th aspect of the present invention is the video recording apparatus according to the 18th aspect of the present invention, wherein, when the recording frame-rate is different from the playing frame-rate, said multiplexing device performs multiplexing of the compressed encoding picture signals so that the data-rate of the system stream during playing, which corresponds to the playing frame-rate, approximately matches the reference system data-rate.

The 20th aspect of the present invention is the video recording apparatus according to the 19th aspect of the present invention, wherein said multiplexing device is operable to perform the multiplexing so that an output data-rate of the system stream is at Rts×(X/Y) bits/second as said multiplexing device outputs the system stream to said recording device when the compressed picture data has been subjected to compression encoding so that the compressed picture data can be decoded at R bits/second even if X is different from Y and a data-rate of the system stream is Rts bits/second (Rts is a real number of Rts>R), wherein the recording frame-rate is X frames/second (X is a real number), the playing frame-rate is Y frames/second, and a playing data-rate of the compressed picture data when X and Y are the same is reference data-rate R bits/second (R is a real number).

The 21st aspect of the present invention is the video recording apparatus according to the 18th aspect of the present invention, wherein, when the recording frame-rate is different from the playing frame-rate, said multiplexing device changes a data-rate of the system stream during playing based on a frame-rate of the input picture signals.

The 22nd aspect of the present invention is the video recording apparatus according to the 2nd aspect of the present invention, comprising a valid frame detection device operable to retrieve a valid frame flag from the input picture signals by using an input valid frame flag and output the retrieved valid frame to said picture encoding device when the input picture signals are picture signals generated by repeating each frame one or more times and when a valid frame flag indicating a valid frame, which is an original frame for generating said input picture signals, is input.

The 23rd aspect of the present invention is the video recording apparatus according to the 1st aspect of the present invention, wherein said multiplexing device is operable to input sound data in addition to the compressed picture data, and (1) when the recording frame-rate and the playing frame-rate are the same, said multiplexing device multiplexes the input sound data and the system stream, and (2) when the recording frame-rate is different from the playing frame-rate, said multiplexing device does not multiplex the input sound data and the system stream.

The 24th aspect of the present invention is the video recording apparatus according to the 1st aspect of the present invention, comprising a sound conversion device, wherein, when sound data is also input in addition to the compressed picture data, and (1) when the recording frame-rate and the playing frame-rate are the same, said sound conversion device outputs the sound data as recorded sound data without changing a sampling frequency of the input sound data, and (2) when the recording frame-rate is different from the playing frame-rate, said sound conversion device converts the sampling frequency of the input sound data to a different frequency and outputs the sound data as recorded sound data; and
wherein said multiplexing device is operable to multiplex the output recorded sound data in the system stream.

The 25th aspect of the present invention is the video recording apparatus according to the 24th aspect of the present invention, wherein said sound conversion device is operable to convert a sampling frequency of the input sound data to X/Y times the frequency when X and Y are different, wherein the recording frame-rate is X frames/second (X is a real number) and the playing frame-rate is Y frames/second (Y is a real number).

The 26th aspect of the present invention is the video recording apparatus according to the 1st aspect of the present invention, wherein the system stream comprises a plurality of packets; and
wherein said recording device is operable to multiplex packet playing time management information defining times for playing in the packets included in the system stream, and record it on the recording medium;
wherein said recording device is operable to change packet playing time information from reference packet playing time information and multiplex the information when the recording frame-rate is different from the playing frame-rate;
wherein the reference packet playing time information is packet playing time information when the recording frame-rate and the playing frame-rate are the same.

The 27th aspect of the present invention is the video recording apparatus according to the 26th aspect of the present invention, wherein said recording device has a clock operable to generate the packet playing time information whose frequency can be changed from a reference value used when the recording frame-rate and the playing frame-rate are the same; and
wherein, when the recording frame-rate is different from the playing frame-rate, said recording device changes a frequency of said clock from the reference value and uses the changed frequency to generate the packet playing time management information.

The 28th aspect of the present invention is the video recording apparatus according to the 27th aspect of the present invention, wherein, when the recording frame-rate is X frames/second (X is a real number) and the playing frame-rate is Y frames/second, said recording device changes a frequency of said clock to X/Y times the reference value when X and Y are the same and uses said clock to generate the packet playing time management information.

The 29th aspect of the present invention is the video recording apparatus according to the 26th aspect of the present invention, wherein, when the recording frame-rate is X frames/second (X is an real number) and the playing frame-rate is Y frames/second, said recording device calculates the packet playing time information so that a difference between values for successive packet playing time information is approximately X/Y times a difference between values for the corresponding reference packet playing time information.

The 30th aspect of the present invention is the video recording apparatus according to the 29th aspect of the present invention, wherein said recording device is operable to determine by selecting a difference of corresponding packet playing time information from a plurality of values and calculate the packet playing time information so that an average of the selected results is X/Y times a difference of the reference packet playing time information when said recording device calculates the difference between values of corresponding packet playing time information so that the packet playing time information is approximately X/Y times a difference of successive pieces of the reference packet playing time information.

The 31$^{st}$ aspect of the present invention is a video recording apparatus comprising:
a picture encoding device operable to perform compression encoding of input picture signals obtained from an imaging device that can vary a frame-rate during imaging and output compressed picture data; and
a recording device operable to record the outputted compressed picture data on a recording medium;
wherein the compressed picture data is recorded on the recording medium at the frame-rate during imaging; and
wherein the compressed picture data recorded on the recording medium is converted into a previously decided predetermined frame-rate for playing.

The 32$^{nd}$ aspect of the present invention is a multiplexing method comprising:
multiplexing time management information defining times for decoding and compressed picture data generated by performing compression encoding on picture signals and outputting a system stream; and
recording the system stream on a recording medium,
wherein, when a recording frame-rate of the input picture signals is different from a preset playing frame-rate for playing picture signals obtained after recording, playing, and decoding the system stream, said multiplexing multiplexes the time management information corresponding to the preset playing frame-rate and the compressed picture data.

The 33$^{rd}$ aspect of the present invention is a multiplexing method for multiplexing time management information defining times for decoding and compressed picture data that has been subjected to compression encoding on X picture signals whose frame-rate is X frames/second (X is a real number) so that the X picture signals can be decoded as Y picture signals whose frame-rate is Y frames/second (Y is a real number) at a playing bit rate of R bits/second (R is a real number);
wherein said method comprises multiplexing standard time management information so that a difference between values of time management information is X/Y-fold; and
wherein when X=Y, a reference time management information is time management information to be multiplexed on compressed picture data that has been subjected to compression encoding so that the X picture signals can be decoded at playing bit rate R bits/second.

The 34$^{th}$ aspect of the present invention is a multiplexing method for multiplexing time management information defining times for decoding and compressed picture data that has been subjected to compression encoding so that X picture signals whose frame-rate is X frames/second (X is a real number) can be decoded as Y picture signals whose frame-rate is Y frames/second (Y is a real number);
wherein said method comprises controlling timing reference information (PCR) among time management information so that an interval for multiplying is Y/X-fold.

The 35$^{th}$ aspect of the present invention is a picture encoding method comprising:
performing compression encoding on input picture signals and outputting the compressed picture data;
multiplexing other information and the compressed picture data and outputting a system stream; and
recording the system stream on a recording medium;
wherein, said performing compression encoding changes a recording data-rate of the compressed picture data from a reference data-rate and performs compression encoding on the input picture signals when the recording frame-rate is different from the playing frame-rate, wherein a reference data-rate is a playing data-rate of the compressed image data when a recording frame-rate of the picture signals and a preset playing frame-rate of playing picture signals obtained after recording, playing, and decoding the system stream are the same.

The 36$^{th}$ aspect of the present invention is a picture encoding method for performing compression encoding X picture signals whose frame-rate is X frames/second (X is a real number) so that the X picture signals can be decoded as Y picture signals whose frame-rate is Y frames/second (Y is a real number) at a playing bit rate Rbits/second (R is a real number), said method comprising:
obtaining a playing frame-rate Y and a playing bit-rate R;
inputting a value for imaging a frame-rate X;
setting an input picture frame-rate for a rate-controlling picture_rate to X and a target rate of a compressed picture data bit_rate to R·(X/Y); and
performing rate-controlling of compression encoding by using the values for the picture_rate and bit_rate.

The 37$^{th}$ aspect of the present invention is a picture encoding method for performing compression encoding on X picture signals whose frame-rate is X frames/second (X is a real number) so that the X picture signals can be decoded as Y picture signals whose frame-rate is Y frames/second (Y is a real number) at a playing bit rate R bits/second (R is a real number), said method comprising:
obtaining a playing frame-rate Y and a playing bit rate R from outside or a memory;
inputting a value for imaging a frame-rate X;
setting an input picture frame-rate for a rate-controlling picture_rate to Y and a target rate of a compressed picture data bit_rate to R; and
performing rate-controlling on compression encoding by using values for the picture_rate and bit_rate.

The 38$^{th}$ aspect of the present invention is a program for use with a computer, said program comprising:
an executable code operable to cause the computer to multiplex time management information defining times for decoding and compressed picture data generated by performing compression encoding of picture signals and cause the computer to output a system stream; and
an executable code operable to cause the computer to record the system stream on a recording medium;
wherein, when a recording frame-rate of the input picture signals is different from a preset playing frame-rate for playing picture signals obtained after recording, playing, and decoding the system stream, said executable code operable to cause the computer to multiplex multiplexes the time management information corresponding to the preset playing frame-rate and the compressed picture data.

The 39$^{th}$ aspect of the present invention is a program for use with a computer, said program comprising:
an executable code operable to cause the computer to performing compression encoding of input picture signals and output the compressed picture data;
an executable code operable to cause the computer to multiplex other information and the compressed picture data and output a system stream; and
an executable code operable to cause the computer to record the system stream on a recording medium; and
wherein said executable code operable to cause the computer to performing compression encoding is operable to change a recording data-rate of the compressed picture data from a reference data-rate and perform compression encoding of the input picture signals when a recording frame-rate is different from a playing frame-rate, wherein the reference data-rate is a playing data-rate of the compressed image data when a recording frame-rate of the input picture signals and a playing frame-rate preset in playing picture signals obtained after recording, playing, and decoding the system stream are the same.

The 40$^{th}$ aspect of the present invention is a program for use with a computer, said program comprising:

an executable code operable to cause the computer to multiplex other information and compressed picture data generated by performing compression encoding on picture signals and cause the computer to output a system stream; and an executable code operable to cause the computer to record the system stream on a recording medium;

wherein said executable code operable to cause the computer to multiplex is operable to change a recording system data-rate of the system stream from a reference data-rate and perform multiplexing when a recording frame-rate is different from a playing frame-rate, wherein the reference system data-rate is a playing data-rate of the system stream when a recording frame-rate of the input picture data and a preset playing frame-rate of playing picture signals obtained after recording, playing, and decoding of the system stream are the same.

The 41$^{st}$ aspect of the present invention is a computer readable medium containing a program according to the 38$^{th}$ aspect of the present invention.

The 42$^{nd}$ aspect of the present invention is a computer readable medium containing a program according to the 39$^{th}$ aspect of the present invention.

The 43$^{rd}$ aspect of the present invention is a computer readable medium containing a program according to the 40$^{th}$ aspect of the present invention.

The 44$^{th}$ aspect of the present invention is the video recording apparatus according to the 11$^{th}$ aspect of the present invention, wherein said multiplexing device is operable to input sound data in addition to the compressed picture data, and (1) when the recording frame-rate and the playing frame-rate are the same, said multiplexing device multiplexes the input sound data and the system stream, and (2) when the recording frame-rate is different from the playing frame-rate, said multiplexing device does not multiplex the input sound data and the system stream.

The 45$^{th}$ aspect of the present invention is the video recording apparatus according to the 18$^{th}$ aspect of the present invention, wherein said multiplexing device is operable to input sound data in addition to the compressed picture data, and (1) when the recording frame-rate and the playing frame-rate are the same, said multiplexing device multiplexes the input sound data and the system stream, and (2) when the recording frame-rate is different from the playing frame-rate, said multiplexing device does not multiplex the input sound data and the system stream.

The 46$^{th}$ aspect of the present invention is the video recording apparatus according to the 11$^{th}$ aspect of the present invention, comprising a sound conversion device, wherein, when sound data is also input in addition to the compressed picture data, and (1) when the recording frame-rate and the playing frame-rate are the same, said sound conversion device outputs the sound data as recorded sound data without changing a sampling frequency of the input sound data, and (2) when the recording frame-rate is different from the playing frame-rate, said sound conversion device converts the sampling frequency of the input sound data to a different frequency and outputs the sound data as recorded sound data; and wherein said multiplexing device is operable to multiplex the output recorded sound data in the system stream.

The 47$^{th}$ aspect of the present invention is the video recording apparatus according to the 18$^{th}$ aspect of the present invention, comprising a sound conversion device, wherein, when sound data is also input in addition to the compressed picture data, and (1) when the recording frame-rate and the playing frame-rate are the same, said sound conversion device outputs the sound data as recorded sound data without changing a sampling frequency of the input sound data, and (2) when the recording frame-rate is different from the playing frame-rate, said sound conversion device converts the sampling frequency of the input sound data to a different frequency and outputs the sound data as recorded sound data; and wherein said multiplexing device is operable to multiplex the output recorded sound data in the system stream.

PREFERRED EMBODIMENTS OF THE INVENTION

A video recording apparatus, a picture encoding method, a multiplexing method, a program, and a recording medium according to the present invention can provide a video recording apparatus consuming a few recording media by recording only valid frames (X picture signals) with the above mentioned configuration. They can also provide a video recording apparatus that does not require any special device at playing as it performs a compression encoding process and a multiplexing process based on a preset playing frame-rate.

Now, a video recording apparatus, a picture encoding method, and a multiplexing method according to the present invention will be described with reference to accompanying drawings.

Embodiment 1

Figure 1:
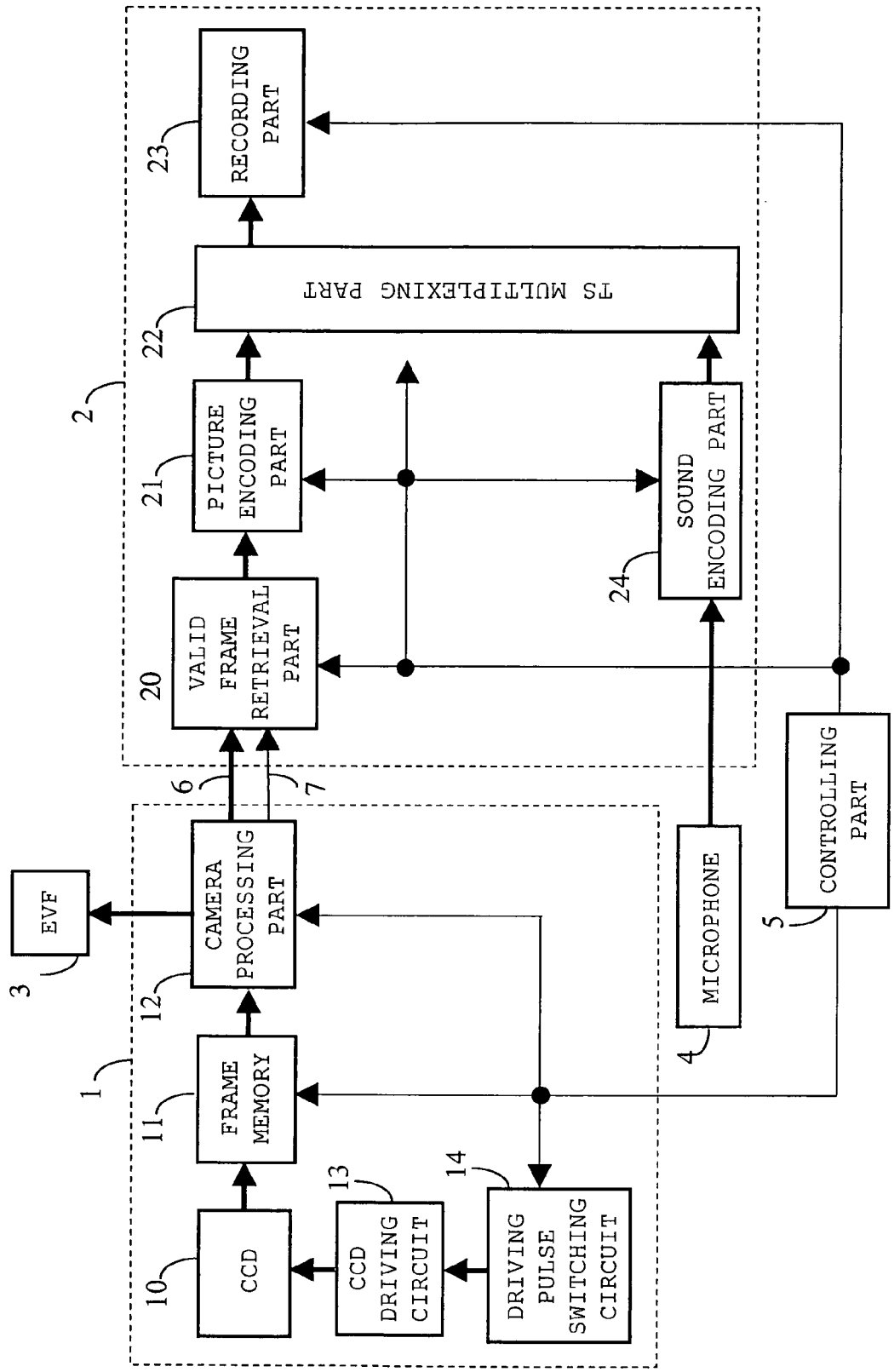
FIG. 1 is a block diagram illustrating an imaging/recording device with a video recording apparatus of embodiment 1 according to the present invention.

FIG. 1 is a block diagram illustrating an imaging/recording device with a video recording apparatus of embodiment 1 according to the present invention.

In FIG. 1; reference numeral 1 denotes an imaging device, 2 denotes a video recording apparatus, 3 denotes an electronic view finder (hereinafter abbreviated for EVF), 4 denotes a microphone, 5 denotes a controlling part, 6 denotes 60p picture signals, 7 denotes a valid frame flag for retrieving a valid frame corresponding to Xp picture signals output from CCD 10 from 60p picture signals.

Reference numeral 10 denotes a CCD, which can scan progressively, 11 denotes frame memory, 12 denotes a camera processing part for performing a camera process, 13 denotes a CCD driving circuit, and 14 denotes a driving pulse switching circuit for switching to and outputting a driving pulse corresponding to a multi-frame rate.

Reference numeral 20 denotes a valid frame retrieval part for retrieving a valid frame from 60p picture signals and outputting the frame as Xp picture signals, 21 denotes a picture encoding part for performing MPEG-video-compression encoding on Xp picture signals and outputting the compressed picture data, 22 denotes a TS multiplexing part for outputting a system stream in the form of MPEG-TS (Transport Stream) by multiplexing time management information defining times for decoding and other necessary information on input compressed picture data or compressed sound data, 23 denotes a recording part for recording a system stream on a recording media, and 24 denotes a sound encoding part.

Picture encoding part 21 in this embodiment is an example of picture encoding means of the present invention, TS multiplexing part 22 in this embodiment is an example of multiplexing device of the present invention, and recording part 23 in this embodiment is an example of recording device of the present invention.

Next, operations of the embodiment will be described.

Imaging device 1 can vary a frame-rate of an imaging device as a conventional imaging device described in "Description of the Related Art" does. Controlling part 5 receives imaging frame-rate value X and playing frame-rate value Y, which are both set by a user, from a user manipulation part (not shown), and outputs controlling signals corresponding to the values to each part. Playing frame-rate value Y is 24 frames/second in the description later. In this embodiment, an imaging frame-rate for a CCD is considered as X frames/second, and picture signals output from a CCD is called Xp picture signals as mentioned in "Description of the Related Art".

Driving pulse switching circuit 14 receives controlling signals from controlling part 5, generates driving pulses needed for imaging Xp picture signals, and outputs the pulses to CCD driving circuit 13. CCD driving circuit 13 drives CCD 10 by converting the driving pulses from driving pulse switching circuit 14 to a predetermined voltage. CCD 10 outputs the imaged Xp picture signals to frame memory 11.

Figure 2:
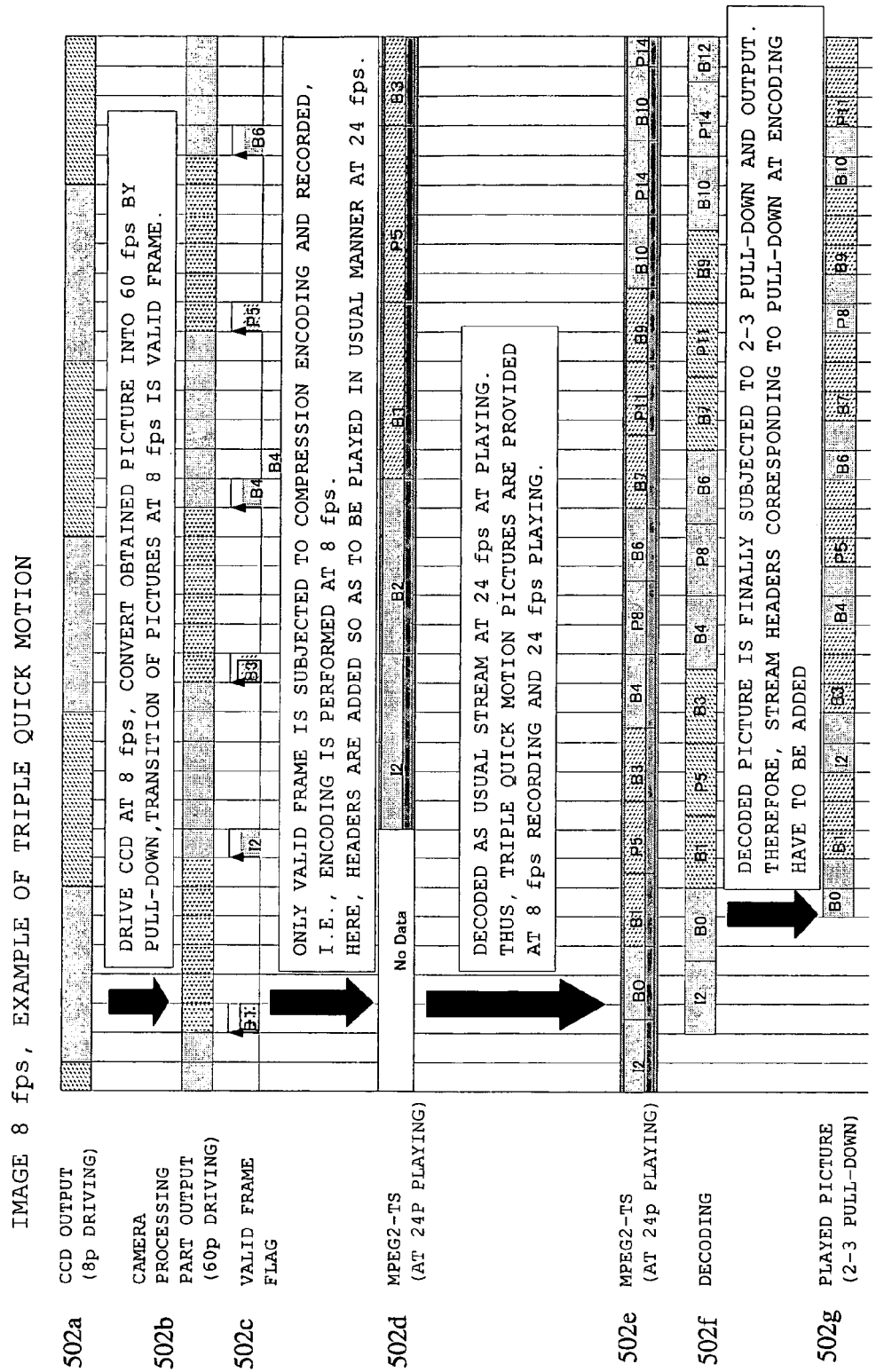
FIG. 2 is a diagram of signal waveforms for each part of FIG. 1.

FIG. 2 is a diagram of signal waveforms for each part of FIG. 1. Reference numeral 502 *a* denotes output signals from CCD 10. Although output signals from CCD 10 appear as actual Xp picture signals in FIG. 2, output signals are only required to include picture information corresponding to Xp picture signals and a format of synchronization signals are not necessarily the same as that of Xp picture signals.

Frame memory 11 outputs 60p picture signals resulted from a pull-down process by writing picture information on Xp picture signals from CCD 10 and reading out the picture information for the same frame for multiple times. Camera processing part 12 performs a predetermined process of a camera process on the 60p picture signals as 60p picture signals and outputs the signals as 60p picture signals indicated by 502 *b* to EVF 3 and valid frame retrieval part 20. EVF 3 can easily display picture information on Xp picture signals by displaying the picture at 60 frames/second.

The picture information varies by an Xp picture signal in 60p picture signals resulted from a pull-down process. As indicated by 502 *c*, valid frame flag 7 for retrieving a valid frame corresponding to Xp picture signals from 60p picture signals is output to valid frame retrieval part 20 at transition between pieces of picture information. Although valid frame flag 7 is adapted to be output separately from picture signal 6, it can be multiplexed and output in a vertical blanking period of picture signal 6, for example.

Valid frame retrieval part 20 retrieves Xp picture signals from 60p picture signals by using valid frame flag 7 and outputs the Xp picture signals to picture encoding part 21. Picture encoding part 21 performs MPEG-video-compression encoding on the input Xp picture signals and outputs the compressed picture data. The compression encoding is performed on the Xp picture signal here, while controlling of a compression encoding rate and addition of a header are performed on the basis of 24 frames/second at playing. If a reference data rate is R bits/second when pictures are recorded in normal recording mode (i.e., an imaging frame-rate, and a playing frame-rate are the same (X=24)), picture encoding part 21 performs rate controlling to perform compression encoding Xp picture signals to R·(X/24) bits/second. The process will be detailed later.

On the other hand, sound signals recorded with microphone 4 are input into sound encoding part 24, subjected to audio-compression encoding, and the compressed sound data is output. The sound signals can be processed in accordance with a frame-rate conversion of picture signals. In other words, where a sampling frequency of sound signals is Fa and a reference data-rate after compression encoding is Ra, the sampling frequency of the sound signals is converted to (X/24) in accordance with the frame-rate of input picture signals and the sound signal is compressed by performing a rate-control so that the data-rate of the compressed sound data will be Ra·(X/24) in performing audio compression encoding. Instead of this, sound data, which is a sampling frequency converted into (X/24) in accordance with a frame-rate of an input picture signal, can be multiplexed on input sound signals without performing compression encoding.

That is to say, when the frame-rate of input picture signals is equal to the frame-rate of a system stream at playing, sound encoding part 24 outputs the sound data as recorded sound data without changing the sampling frequency of the input sound data. When the frame-rate of the input picture signals is different from the frame-rate of the system stream at playing, sound encoding part 24 may convert the sampling frequency of the input sound data into another frequency and output the sound data as recorded sound data.

The embodiment is described for the case that compressed sound data is generated and multiplexed only when X=24 and compressed sound data is neither generated nor multiplexed otherwise, as a more simplified example of implementation.

In other words, TS multiplexing part 22 inputs sound data as well as compressed picture data. When the frame-rate of input picture signals is equal to the frame-rate of a system stream at playing, TS multiplexing part 22 multiplexes the input sound data into the system stream. When the frame-rate of input picture signals is different from the frame-rate of a system stream at playing, TS multiplexing part 22 does not multiplex the input sound data into the system stream.

TS multiplexing part 22 multiplexes time management information defining times for decoding and other necessary information on compressed picture data input from picture encoding part 21 and compressed sound data input from sound encoding part 24 and outputs a system stream in the form of MPEG-TS indicated by 502 *d*.

In 502 *d* or the like, "I" in "I2", for example, denotes I picture, i.e., an encoded picture within a frame (Intra encoded picture), "B" in "B0", for example, denotes B picture, i.e., a bidirectionally predictive encoded picture, "P" in "P5", for example, denotes P picture, i.e., predictive encoded picture in a forward direction between frames (Predictive encoded picture). Therefore, unlike the conventional video recording apparatus described in "Description of the Related Art", the video recording apparatus of the embodiment uses compression between frames for B pictures or P pictures as well as interframe compression.

A system stream output from TS multiplexing part 22 is recorded in recording part 22. Time management information includes PCR (Program Clock Reference) used as a timing reference for decoding and outputting (displaying), PTS (Presentation Time Stamp) indicating a timing to output each decoded frame, and DTS (Decoding Time Stamp) indicating a timing for decoding.

When a system stream recorded in recording part 23 of a video recording apparatus of the embodiment is output to an outside decoding device and the decoding device decodes the output system stream, STC (System Time Clock) used as an operational reference for the decoding device is generated by using PCR. Then, the decoding device is controlled so that decoding and displaying is performed at a time specified as PTS/DTS in accordance with the STC. Therefore, when Xp picture signals are subjected to compression encoding and multiplexing, values for PCR, PTS, and DTS need to be changed so that the controlling is performed at playing in the same manner as in the case that a system stream, in which 24p picture signals are subjected to compression encoding and multiplexed, is played. Thus, when a frame-rate of Xp picture signals is different from a preset frame-rate of a system stream at playing to be recorded in recording part 23, TS multiplexing part 22 multiplexes time management information corresponding to a preset frame-rate of a system stream at playing into compressed picture data. The frame-rate of Xp picture signals of the embodiment is an example of a recording frame-rate of the present invention and the preset frame-rate of a system stream at playing of the embodiment is an example of a playing frame-rate of the present invention. This will be detailed later.

At playing, a system stream is played in the same form as 24p picture signals are played at a reference data-rate as indicated by 502 *e*. Compressed picture data is also decoded in the same way as for usual 24p picture signals as indicated by 502 *f*. Finally, decoded 24p picture signals are subjected to so-called 2-3 pull-down to a progressive or an interlace picture at 60 frames/second to comply with interface generally used between the video recording apparatus of the embodiment and a picture monitor and then output. Therefore, when compression encoding is performed, picture encoding part 21 has to set "repeat_first_field, top_field_first" in correspondence with this 2-3 pull-down.

Figure 3:
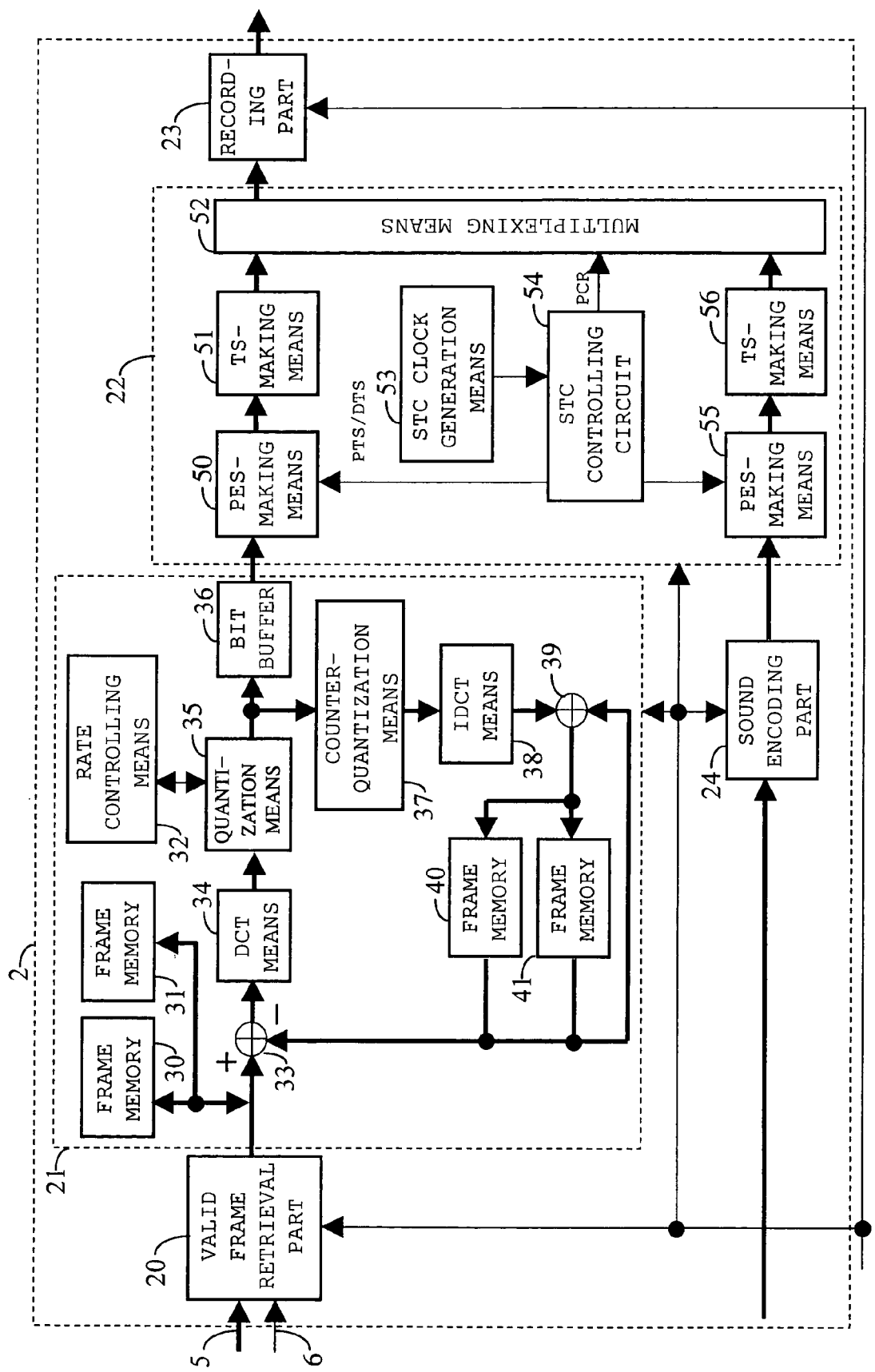
FIG. 3 is a detailed block diagram illustrating video recording apparatus 2 of the embodiment 1 according to the present invention.

FIG. 3 is a block diagram illustrating video recording apparatus 2 of the embodiment 1 according to the present invention in more detail. The same numerals are given to the same components as those in FIG. 1 and the detailed descriptions thereof are omitted. Reference numerals 30 and 31 denote frame memory for storing frames corresponding to a B picture of MPEG2 for changing the order of processing the input frame, 32 denotes rate controlling means of controlling to make the data rate of the compressed picture data approach a target value, 33 denotes subtractor, 34 denotes DCT means, 35 denotes quantization means, 36 denotes a bit buffer for temporally storing compressed picture data in order to output the compressed picture data at a constant rate, 37 denotes counter-quantization means, 38 denotes IDCT means, 39 denotes adder, and 40 and 41 denote frame memory for storing reference pictures. Picture encoding part 21 including them performs MPEG2-video-compression-encoding. As MPEG2-Video is a well known standard to those skilled in the art, detailed description of respective terms based on the standard, such as DCT or quantization, and operations of associated blocks will be omitted. As a single picture to be encoded is generally called "a picture" in MPEG2 standard, "a picture" and "a frame" are used interchangeably in the following description. Thus, the terms "a frame" and "a picture" mean the same thing here.

Reference numerals 50 and 55 denote PES-making means of generating a PES packet corresponding to a picture and a sound respectively, 51 and 56 denote TS-making means of generating a TS packet by dividing an input PES packet and multiplexing necessary information, 52 denotes multiplexing means of multiplexing a TS packet and another necessary packet for a picture and a sound respectively, and 53 denotes STC clock generation means of generating an STC clock used as a reference for a time axis to create time management information. STC clock generation means 53 is an example of a clock according to the present invention. Reference numeral 54 denotes an STC controlling circuit for generating time management information from an STC clock, while managing timing for multiplexing. TS multiplexing part 22 including them performs MPEG2-TS multiplexing. As MPEG2-TS is a well known standard to those skilled in the art, detailed description of respective terms based on this standard, such as PES (Packetized Elementary Stream) or TS (Transport Stream), and operations of associated blocks will be omitted.

Figure 4:
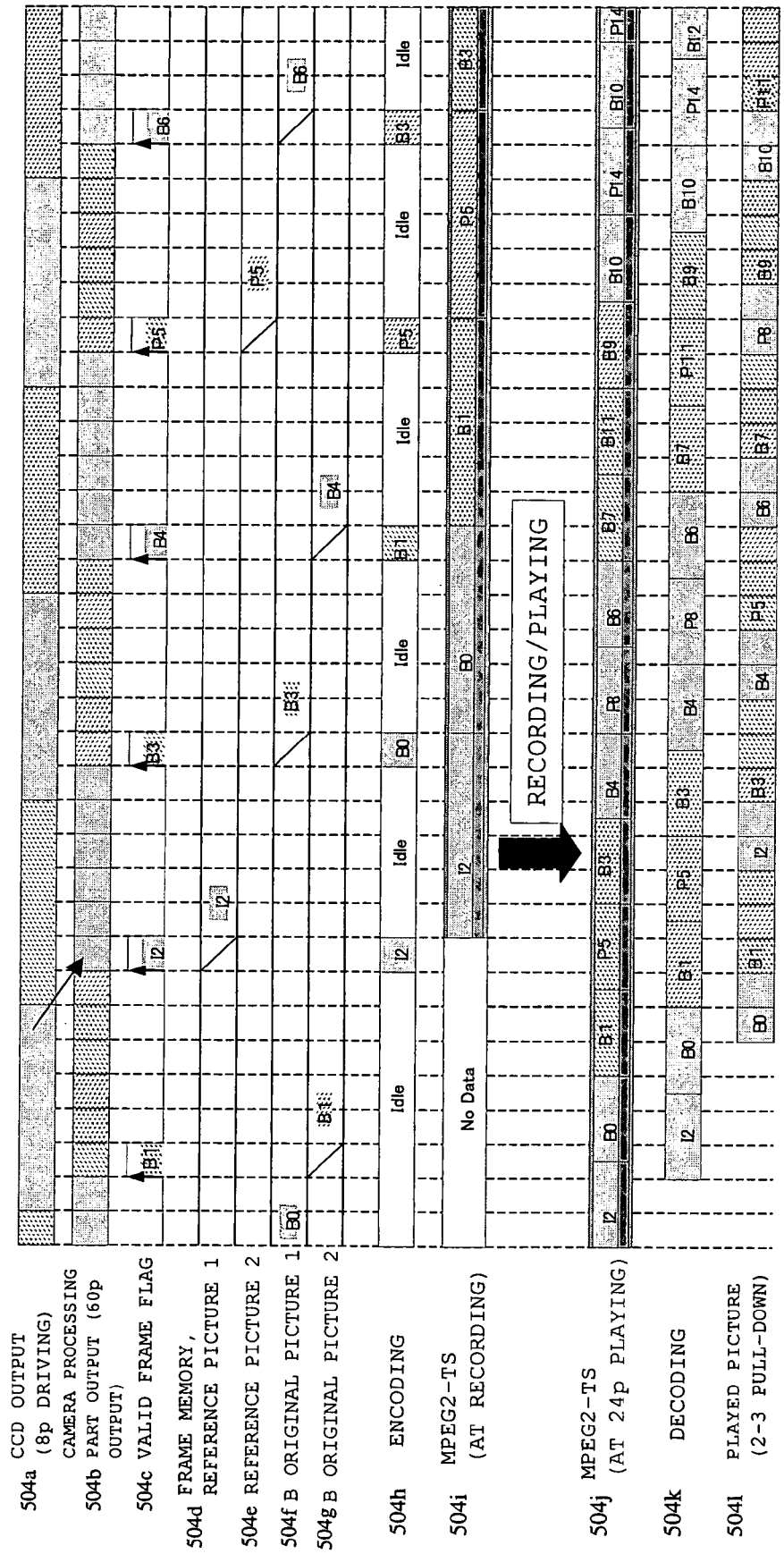
FIG. 4 is a diagram of signal waveforms for respective parts of FIGS. 1 and 3.

FIG. 4 is a diagram of signal waveforms for respective parts of FIGS. 1 and 3. 504 *d* is a chart illustrating a content of frame memory 30, 504 *e* is a chart illustrating a content of frame memory 31, 504 *f* is a chart illustrating a content of frame memory 40, and 504 *g* is a chart illustrating a content of frame memory 41. In order to limit the frame memory for storing frames corresponding to B pictures to two of 30 and 31, each frame of Xp picture signals has to be encoded at the same speed as that for 60p picture signals as shown in 504 *h*.

Now, rate controlling in compression encoding of a picture according to the present invention will be detailed. As mentioned above, picture encoding part 21 has to perform rate controlling so that Xp picture signals are subjected to compression encoding to R·(X/24) bits/second in the present invention.

Figure 5:
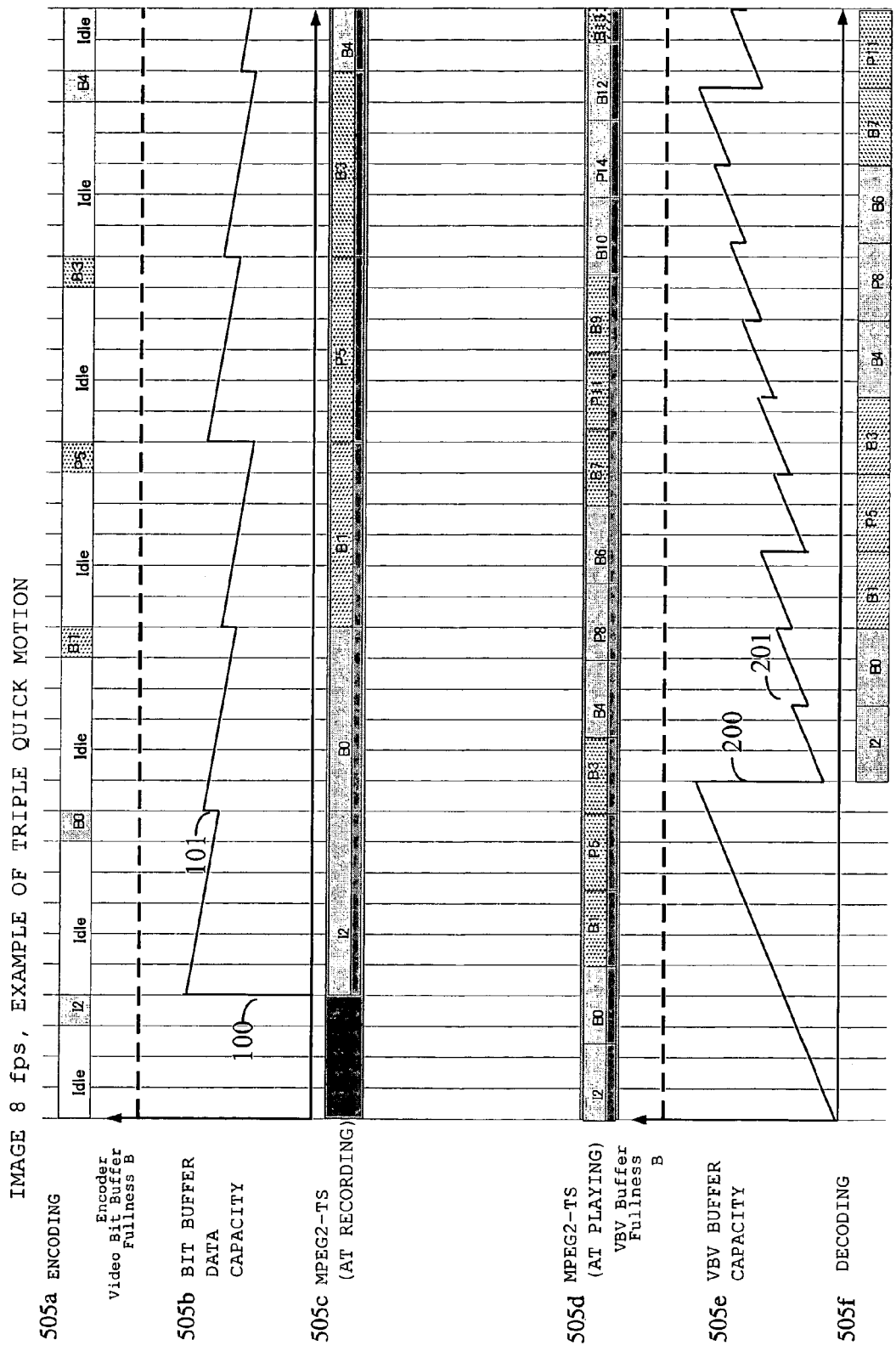
FIG. 5 is a diagram showing a data capacity of bit buffer 36 and a VBV buffer capacity allowing for decoding at playing.

FIG. 5 is a diagram showing a data capacity of bit buffer 36 in a picture encoding part and a VBV buffer capacity allowing for decoding at playing. Rate controlling means 32 has to control a data rate of compressed picture data so that a VBV buffer at playing generates neither overflow nor underflow as shown in 505 *e*. 505 *c* is a chart illustrating how each frame is recorded with time during recording. 505 *d* is a chart illustrating how each frame is played with time at playing. When 505 *c* and 505 *d* are compared, the time axis changes based on a ratio between an imaging frame-rate X and playing frame-rate 24, though the content of data is exactly the same. Therefore, the data-rate in 505 *c* is what the data-rate in 505 *d* multiplied by X/24.

As a result, a rate at which a data capacity of a bit buffer decreases (be output) in 505 *b* is what a standard rate of compressed picture data R multiplied by X/24. On the other hand, a distance between pictures is an inverse number of imaging fame-rate X. Thus, amounts of data to be generated by performing compression encoding on frames respectively, i.e., the lengths of respective vertical lines (vertical lines 100 and 200, 101 and 201) assuming the scale of vertical axes of 505 *b* and 505 *e* are the same are equal. That is to say, a target amount of data for each compressed frame is the same as when 24p picture signals are compressed (although input picture signals are Xp picture signals) at rate controlling means 32.

Figure 6:
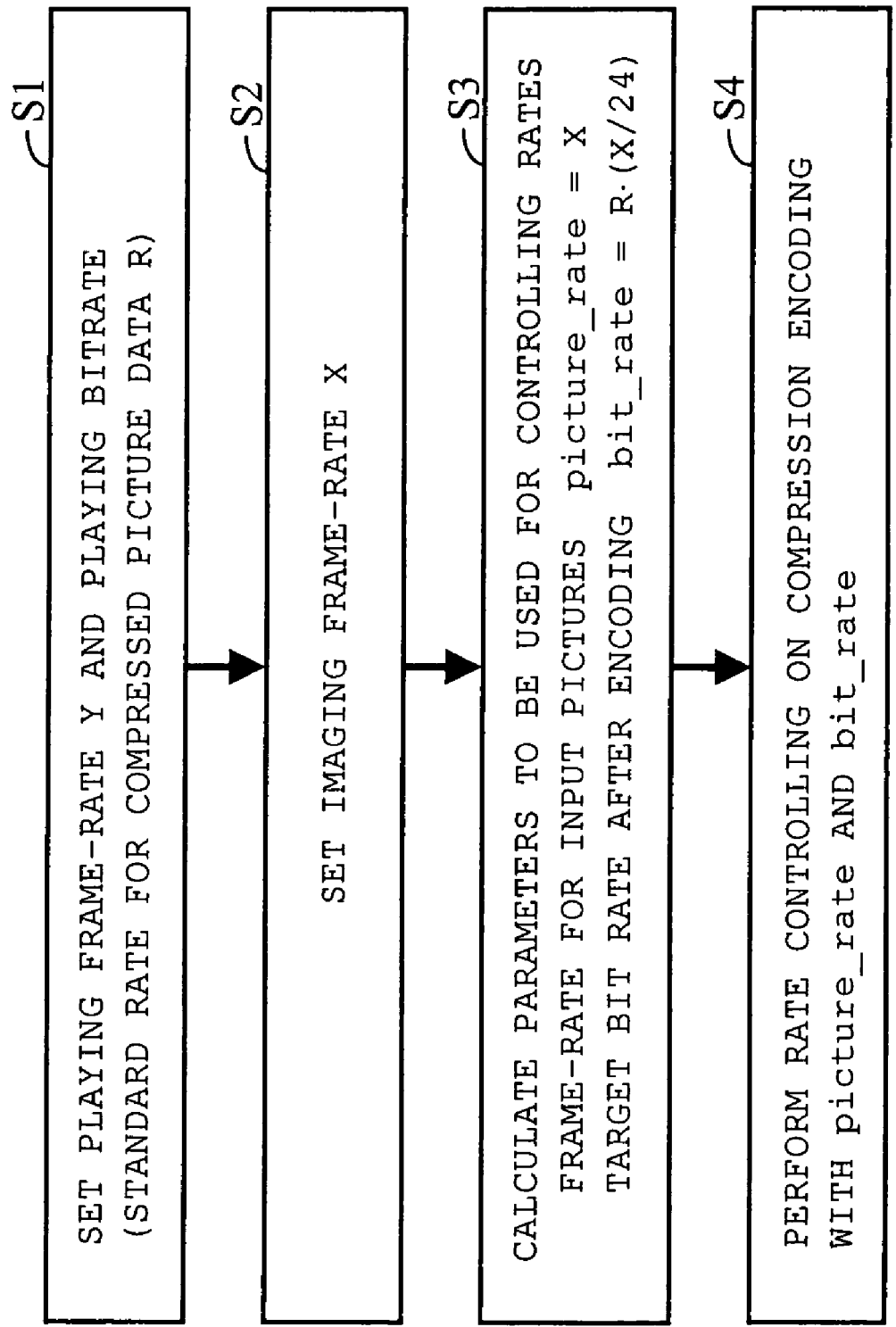
FIG. 6 is a chart showing a procedure in rate controlling means 32.

FIG. 6 is a chart showing a procedure in rate controlling means 32. At step S1, playing frame-rate Y (fixed to 24 in this embodiment) and playing bit-rate R (a standard rate for compressed picture data) are set. Values for Y and R can be determined from inputs with switches or on a GUI (Graphical User Interface) screen, for example, or can be read out from non-volatile memory that has already stored preset values at implementing the video recording apparatus. Then at step S2, imaging frame-rate value X is set from inputs with switches or on a GUI screen.

At step S3, parameters to be used for controlling actual rates are calculated. One of them is a picture_rate, which is a frame-rate for pictures input into picture encoding part 21. Imaging frame-rate value X can be used for the picture_rate. The other is a bit_rate, which is a target rate of compressed picture data. The bit_rate can be obtained by multiplying a playing bit rate R by a ratio between imaging frame-rate and playing frame-rate (X/Y).

Finally at step S4, rate controlling is performed on compression encoding by using values for Picture_Rate and bit_rate obtained at step S3. Any method can be used for rate controlling. For example, a rate-controlling method in MPEG2 TM5 (Test Model 5), which is publicly known and used in standardizing MPEG2, is available. The case where a controlling method for MPEG2 TM5 is used will be described below.

At rate controlling means 32, a target amount of data to be allocated to the picture next to a certain GOP (Group of Picture) is set according to an expression shown in Formula 1, for example. In Formula 1, Ti is a target amount of data to be allocated to I picture next. Tp is a target amount of data to be allocated to P picture nest. Tb is a target amount of data to be allocated to B picture next. Kp and Kb are constant numbers depending on processing of quantization means 35. Rgop is a remaining amount of bits allocated to a currently processed GOP. Np and Nb are remaining numbers of P pictures and B pictures included in a currently processed GOP. Xi, Xp and Xb are indicators indicating how previously encoded I pictures, P pictures, and B pictures are complicated, respectively. As details of the parameters are disclosed in MPEG TM 5, description of them will be omitted.

$$Ti = \max\left\{\frac{Rgop}{\left(1 + \frac{Np \cdot Xp}{Xi \cdot Xp} + \frac{Nb \cdot Xb}{Xi \cdot Kb}\right)}, \frac{bit\_rate}{8 \cdot picture\_rate}\right\} \quad \text{[Formula 1]}$$

$$Tp = \max\left\{\frac{Rgop}{\left(Np + \frac{Nb \cdot Kp \cdot Xb}{Kb \cdot Xp}\right)}, \frac{bit\_rate}{8 \cdot picture\_rate}\right\}$$

$$Tb = \max\left\{\frac{Rgop}{\left(Nb + \frac{Np \cdot Kb \cdot Xb}{Kp \cdot Xb}\right)}, \frac{bit\_rate}{8 \cdot picture\_rate}\right\}$$

Formula 2 is provided as an initial value of Rgop at the top of the sequence for encoding in Formula 1. The initial value is updated each time a picture is encoded thereafter. N is the number of pictures included in a first GOP in a sequence.

$$Rgop\_ini = \frac{bit\_rate \cdot N}{picture\_rate} \quad \text{[Formula 2]}$$

Therefore, Ti, Tp, and Tb obtained by Formula 1 change according to a bit_rate, which is a target rate for compressed picture data, and a picture_rate, which is a frame rate. When rate controlling means 32 is implemented in accordance with MPEG2 TM5 (using Formula 1 and Formula 2), buffer controlling shown in 505 *b* can be easily provided by making bit_rate R·(X/24) and picture_rate X.

When the frame-rate of input picture signals is X frames/second, a preset frame-rate at playing of a system stream is Y frames/second, and the reference data-rate at playing of a compressed picture data included in a system stream is R bits/second, picture encoding part 21 thus performs rate-controlling so that input picture signals are subjected to compression encoding at a data-rate of R×(X/Y) bits/second.

It is indicated that a target amount of data for each compressed frame is the same as when 24p picture signals are compressed (although input picture signals are Xp picture signals) in FIG. 5. Accordingly, a process at step S3 can be changed to another process of setting picture_rate=Y and bit_rate=R. In the above mentioned rate controlling for MPEG2 TM5, every expression associated with rate controlling changes depending on a proportion of bit_rate/picture_rate and both of them are used, the same result can be obtained when bit_rate is R and picture_rate is Y, as shown in Formula 3.

$$\frac{bit\_rate}{picture\_rate} = \frac{R \cdot (X/Y)}{X} \quad \text{[Formula 3]}$$
$$= \frac{R}{Y}$$

That is to say, when the frame-rate of input picture signals is X frames/second, the preset frame-rate at playing of a system stream is Y frames/second, and the reference data-rate at playing of a compressed picture data included in a system stream is R bits/second, picture encoding part 21 can obtain the same result as mentioned above even though it performs rate controlling so as to perform compression encoding on picture signals whose frame-rate is Y at a data-rate of R bits/second, regardless of the frame-rate of input picture signals being X.

In other words, when the frame-rate of input picture signals is different from the frame-rate at playing, picture encoding part 21 performs compression encoding on the input picture signals so that the signals virtually matches with a reference data-rate at playing of compressed picture data, corresponding to the frame-rate at playing. Thus, picture encoding part 21 can control data-rate of compressed picture data so that a VBV buffer generates neither overflow nor underflow at playing.

Next, generation of time management information of the embodiment according to the present invention will be detailed. As mentioned above, this embodiment requires changing an interval for multiplexing PCR, PTS, and DTS, while changing values for PCR, PTS, and DTS so that the same controlling can be performed as in the case that a system stream, in which 24p picture signals have been subjected to compression encoding and multiplexing at playing, is played.

When MPEG2-TS encoded, multiplexed, and recorded as shown in 505 $c$ is played and decoded as shown in 505 $d$, time intervals between PCRs, PTSs, and DTSs which are multiplexed at 505 $c$ are $24/X$ times their time intervals in 505 $d$. Thus, when the frame-rate of input picture signals is $X$ frames/second and the preset frame-rate of a system stream at playing is $Y$ frames/second, the time interval for multiplexing PCR, PTS, and DTS is $Y/X$ times a reference time interval when it is recorded at $X$ frames/second, where a time interval for the same value of $X$ and $Y$ is a reference time interval. On the other hand, these values are generated by using a count at the timing required for counting STC clock, which is used as a reference for a time axis at TS multiplexing part 22, and for multiplexing. Therefore, when the interval for multiplexing is $24/X$-fold, the interval between values is also $24/X$-fold, which leads to some problems.

Therefore, in the present invention, values for PCR, PTS, and DTS are adjusted. One of the ways is available by generating PCR, PTS, and DTS (an interval between whose values is $24/X$-fold) leaving an STC clock at a usual frequency, then multiplying these values by $X/24$ with a calculator or software, and multiplexing the result. That is to say, when the frame-rate of input picture signals is $X$ frames/second and the preset frame-rate of a system stream at playing is $Y$ frames/second, TS multiplexing part 22 calculates time management information and multiplexes so that a difference of values between pieces of time management information is $X/Y$ times a difference of values between pieces of reference time management information, where time management information generated as $X$ and $Y$ are the same is reference time management information. STC controlling circuit 54 for performing this process is easily available by adding a calculator or a CPU to output stages of PCR, PTS, and DTS.

As an interval for multiplexing PCR is defined as 100 ms at the maximum in the MPEG2 standard, an interval for multiplexing needs to be controlled to comply with this restriction at playing bit_rate R. This is available by controlling STC control circuit 54 so that an interval for multiplexing PCR is a time uniformly multiplied by $24/X$ in an actual time. That is to say, when the frame-rate of input picture signals is $X$ frames/second and the preset frame-rate of a system stream at playing is $Y$ frames/second, TS multiplexing part 22 adds PCR so that an interval for multiplexing PCR is $Y/X$ times a reference interval for multiplexing, where an interval for multiplexing as $X$ and $Y$ are the same is a reference interval for multiplexing.

Another way to comply with the above mentioned restriction is available by multiplying a STC clock used for generating values for PCR, PTS, and DTS by $X/24$. In order to generate this STC clock, a circuit needs to be added to STC clock generation means 53.

Figure 7:
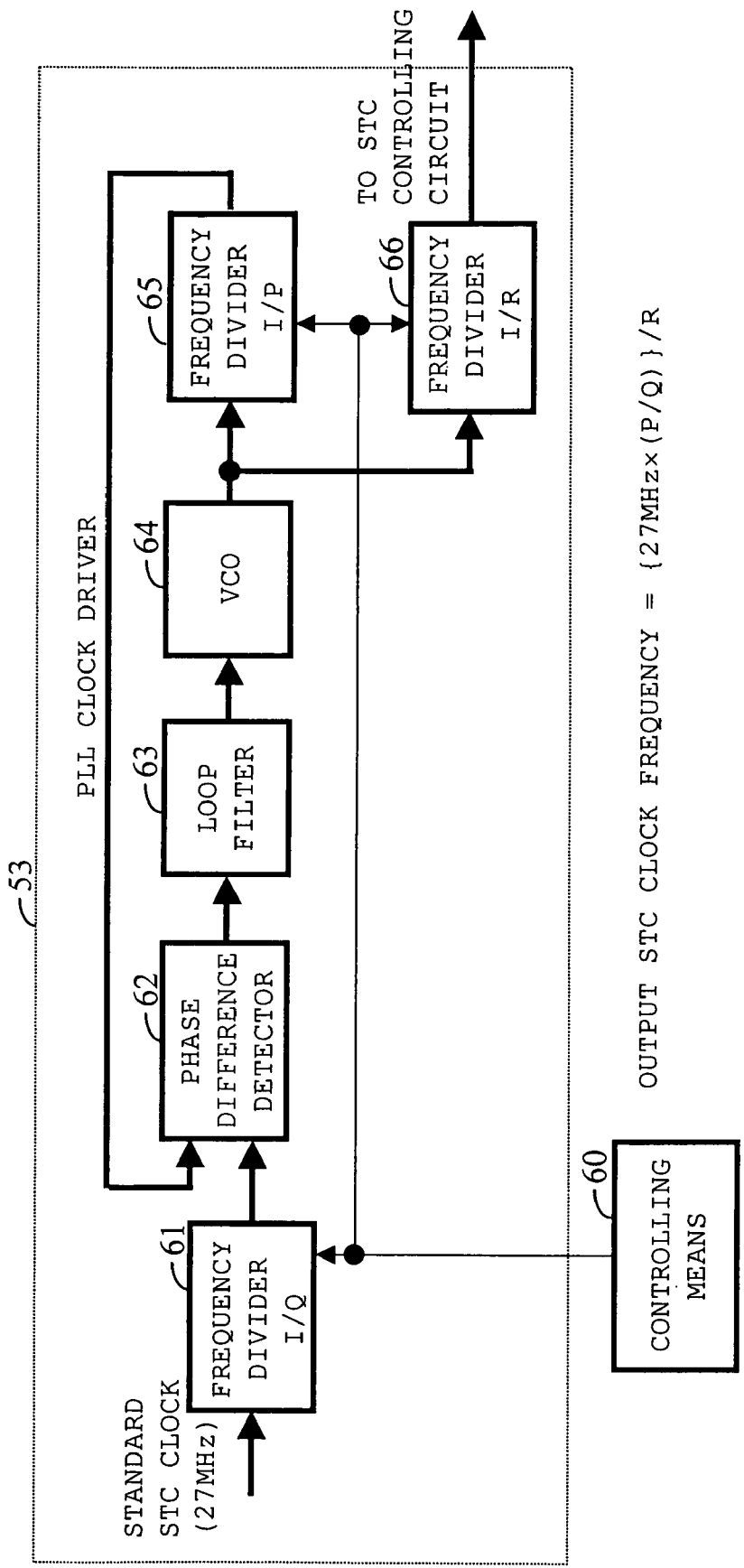
FIG. 7 is a block diagram illustrating a configuration to be added to STC clock generation means 53.

FIG. 7 is a block diagram illustrating a configuration to be added to STC clock generation means 53. Reference numeral 60 denotes controlling means of controlling frequency dividing ratios P, Q, and R for frequency dividers 61, 65, and 66, 61 denotes a frequency divider for dividing a frequency of a standard STC clock to be input by 1/Q, 62 denotes a phase difference detector, 63 denotes a loop filter, 64 denotes a VCO, and 65 denotes a frequency divider for dividing a frequency of an output from VCO 64 by 1/P. Controlling means 60, frequency divider 61, phase difference detector 62, loop filter 63, VCO 64, and frequency divider 65 comprise PLL. Reference numeral 66 denotes a frequency divider for dividing a frequency of an output from VCO 64 by 1/R.

With a configuration shown in FIG. 7, a frequency of STC clock (27 MHz) can be changed to $\{27 \text{ MHz} \cdot (P/Q)\}/R$. Therefore, values for PCR, PTS, and DTS needed for multiplexing MPEG2-TS of 505 $c$ can be generated by multiplying a frequency of STC clock by $X/24$ with this configuration.

That is to say, when the frame-rate of input picture signals is $X$ frames/second and the preset frame-rate of a system stream at playing is $Y$ frames/second, TS multiplexing part 22 changes a frequency of STC clock to $X/Y$ times a reference value as $X$ and $Y$ are the same (27 MHz) and generates respective values for PCR, PTS, and DTS with the changed STC clock. Thus, when the frame-rate of input picture signals is different from the preset frame-rate of a system stream at playing, TS multiplexing part 22 may change a frequency of STC clock from a reference value (27 MHz) and generate respective values for PCR, PTS, and DTS with the changed STC clock.

Figure 8:
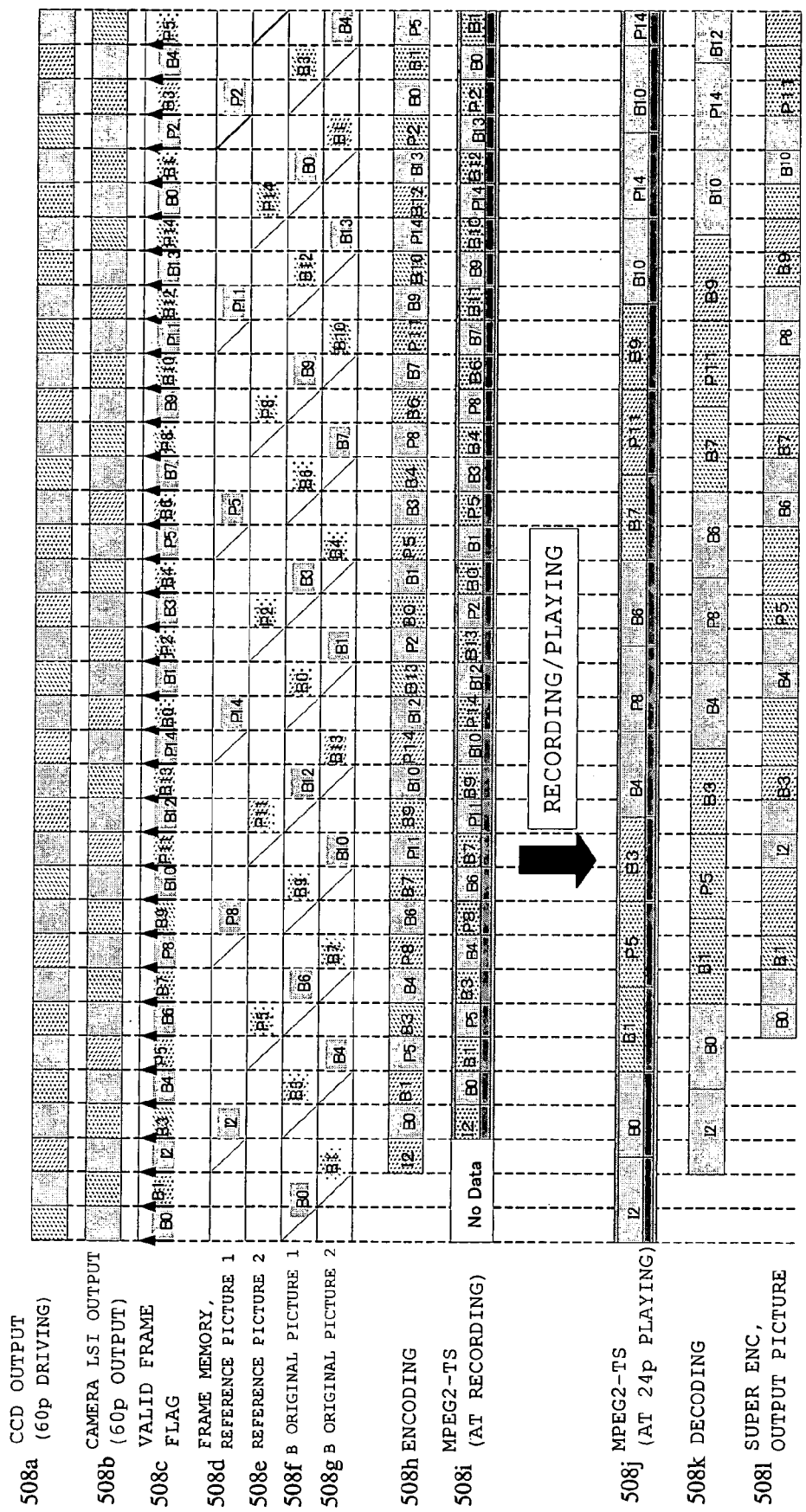
FIG. 8 is a diagram of signal waveforms for respective parts of FIGS. 1 and 3 in the case of slow motion.
Figure 9:
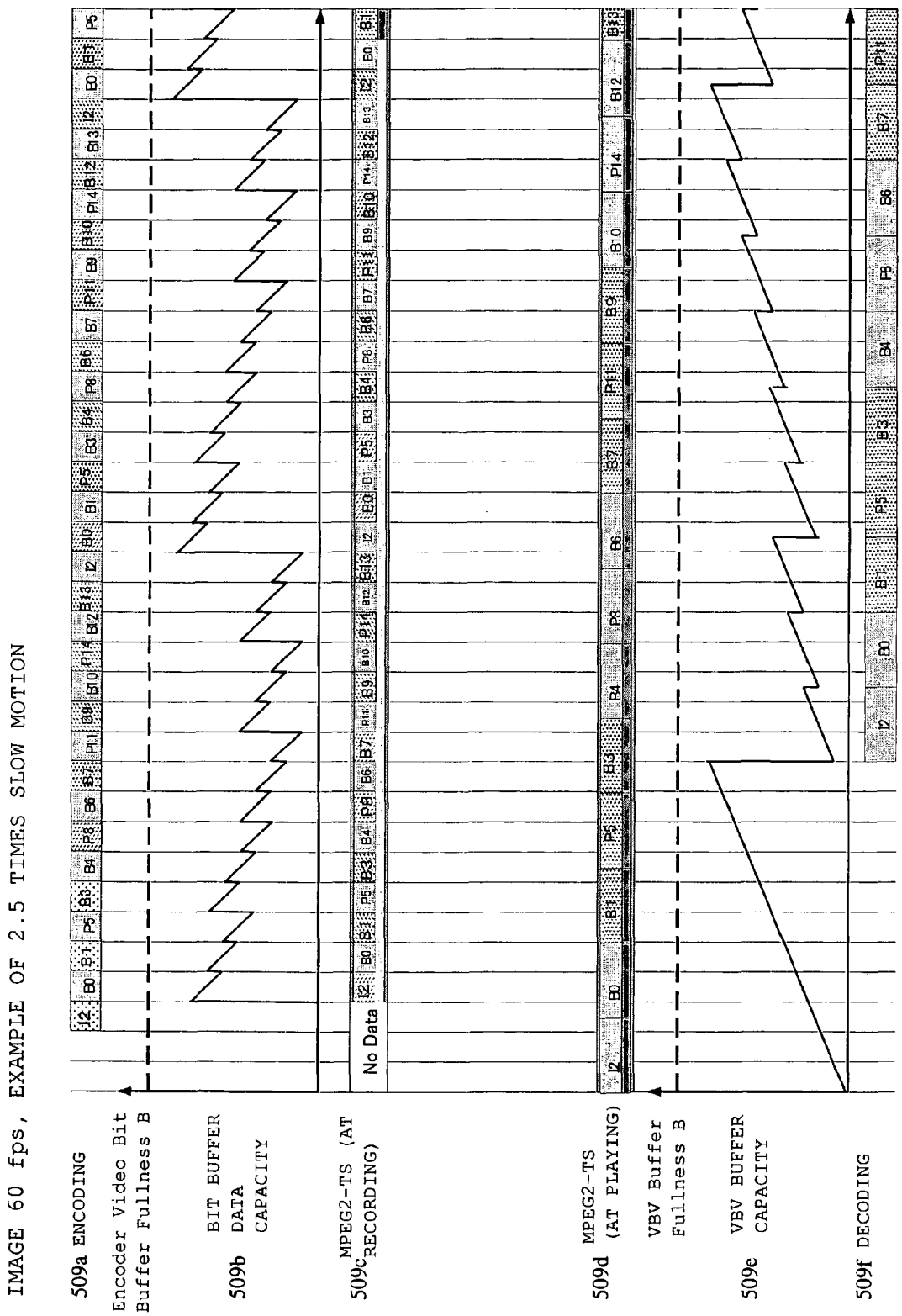
FIG. 9 is a diagram showing a data capacity of bit buffer 36 and a VBV buffer capacity allowing for decoding at playing in the case of slow motion.

Although FIGS. 4 and 5 illustrate the case of triple quick motion at playing where imaging frame-rate $X=8$, slow motion can also be provided at playing by increasing imaging frame-rate $X$ higher than 24 frames/second of playing frame-rate as shown in FIGS. 8 and 9. In this case, it is apparent by comparing FIGS. 4 and 8, and FIGS. 5 and 9, slow motion can be provided at playing by applying the above mentioned configuration and operations, as an imaging frame-rate $X$ and playing frame-rate 24 are only different in size.

The embodiment 1 has thus provided a video recording apparatus, which consumes a few recording medium by only recording valid frames (Xp picture signals). The embodiment 1 can save recording medium as it can achieve high compression ratio by using MPEG2, which is a technology of encoding between frames, instead of encoding within a frame for picture compression encoding. The embodiment 1 can also provide a video recording apparatus that requires no special device, as the apparatus performs a compression encoding process and a multiplexing process based on a preset playing frame-rate (24 frame/second) and signals can be played at the same frame-rate (24 frames/second) and at the same data-rate R as they were recorded in a usual manner.

Needless to say, although the embodiment 1 is described by assuming that imaged Xp picture signals are pull-downed to 60p picture signals and input into a video recording apparatus and that a playing frame-rate is 24 frames/second, picture signals pull-downed and converted into any N frames/second can be input into a video recording apparatus and a playing frame-rate can be processed at M frames/second.

Embodiment 2

Figure 10:
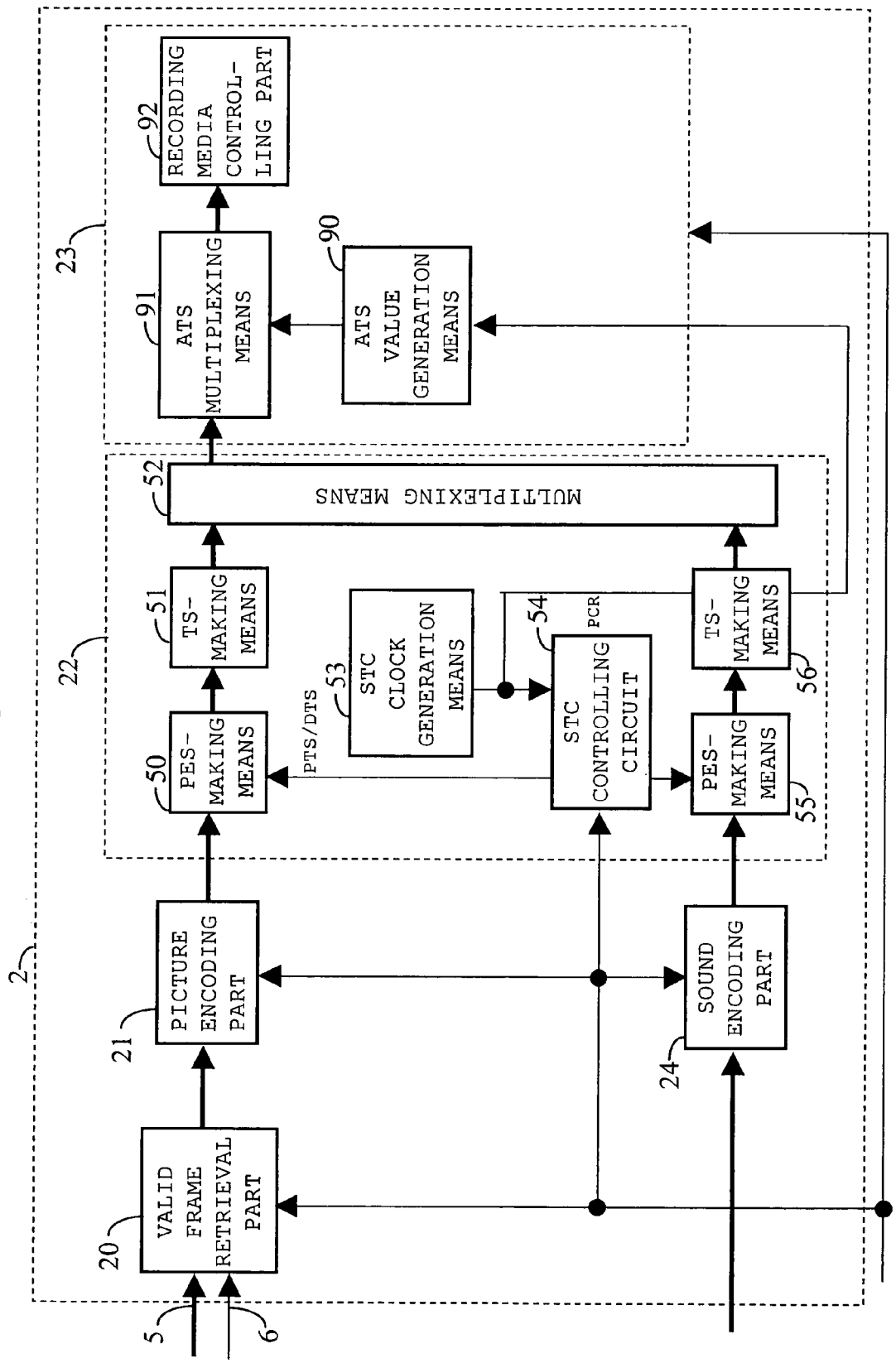
FIG. 10 is a block diagram illustrating video recording apparatus 2 in embodiment 2 according to the present invention.

FIG. 10 is a block diagram illustrating video recording apparatus 2 in embodiment 2 according to the present invention. The same numerals are given to the same components as those in FIGS. 1 and 3, and the detailed descriptions thereof are omitted. Reference numeral 90 denotes ATS value generation means, 91 denotes ATS multiplexing means, and 92 denotes a recording media controlling part.

If an actual available transfer rate is high when MPEG2-TS is transferred from TS multiplexing means 22 to recording means 23, a TS packet will be transferred intermittently. In order to record MPEG2-TS efficiently on a recording medium, unnecessary information such as Null packet in an actual transport stream may be removed. In this case, timing for a TS packet to be input and output to and from recording means 23 needs to be somehow recorded on a recording medium. Blu-ray disk or the like uses Arrival Time Stamp (ATS) for this purpose.

Figure 11:
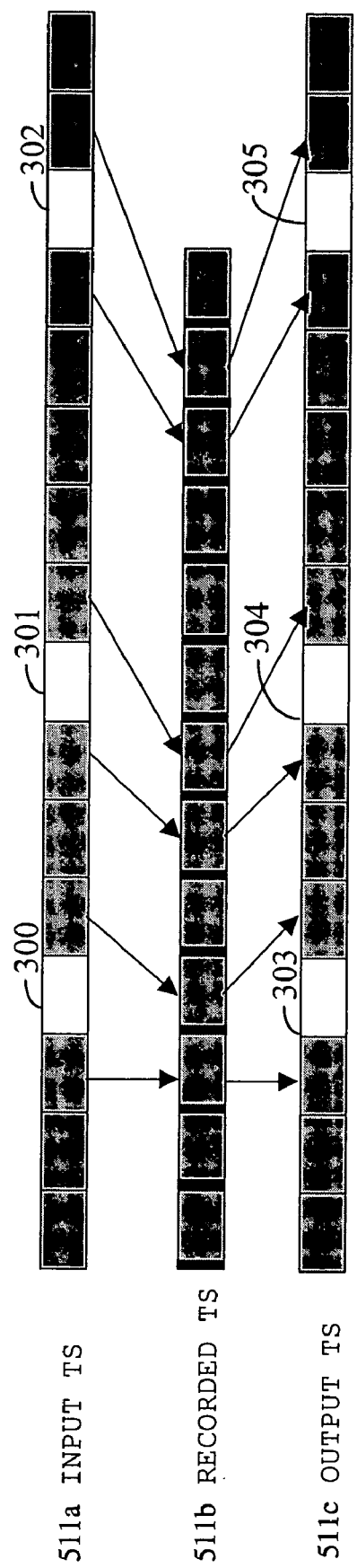
FIG. 11 is a conceptual diagram of storing packet timing when MPEG2-TS is recorded on recording means 23.

Effects of ATS on general recording and playing will be described below. FIG. 11 illustrates a concept of storing packet timing when MPEG2-TS is recorded on recording means 23. 511 $a$ is an input TS from TS multiplexing means 22 to recording means 23. 511 $b$ is TS to be actually recorded on a recording medium. 511 $c$ is TS played and output from a recording medium. 300-302 are Null packets. 303-305 indicate timing without TS packets.

When an input TS of 511 $a$ includes Null packets as shown in 300-302, the Null packets should be removed from a record TS of 511 $b$ for recording, as the Null packets do not include information necessary for recording and playing a picture and a sound. However, as arrival timing has timing information in PCR for MPEG2-TS, a correct STC is not played if it is played as in 511 $b$. Therefore, parts of Null packets need to be blank with no packets as shown in 511 $c$ or Null packets need to be inserted again and input. In order to achieve this, 511 $b$ adds ATS, which indicates input timing for the packet, to the top of each packet to be recorded and record it.

Figure 12:
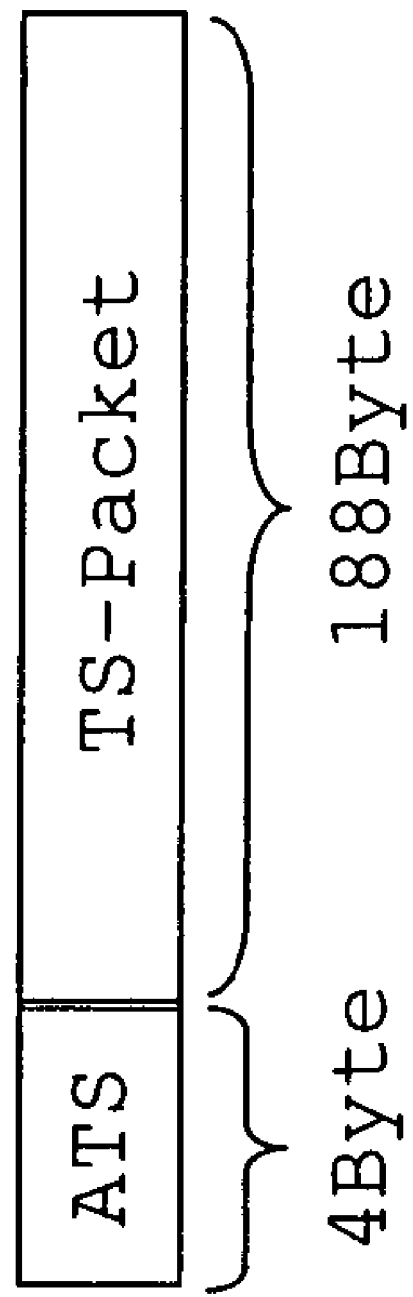
FIG. 12 is an example of a TS packet added with ATS.

FIG. 12 illustrates an example of a TS packet added with ATS. Four bytes of ATS are added before 188 bytes of TS packets for MPEG2-TS. This addition of ATS is achieved by inputting a count from a counter of 32 bits operating at 27 MHz for free run as ATS value generation means 90, for example, into ATS multiplexing means 91, and by adding a count when each TS packet is input into ATM recording means 23 before the TS packet.

Figure 13:
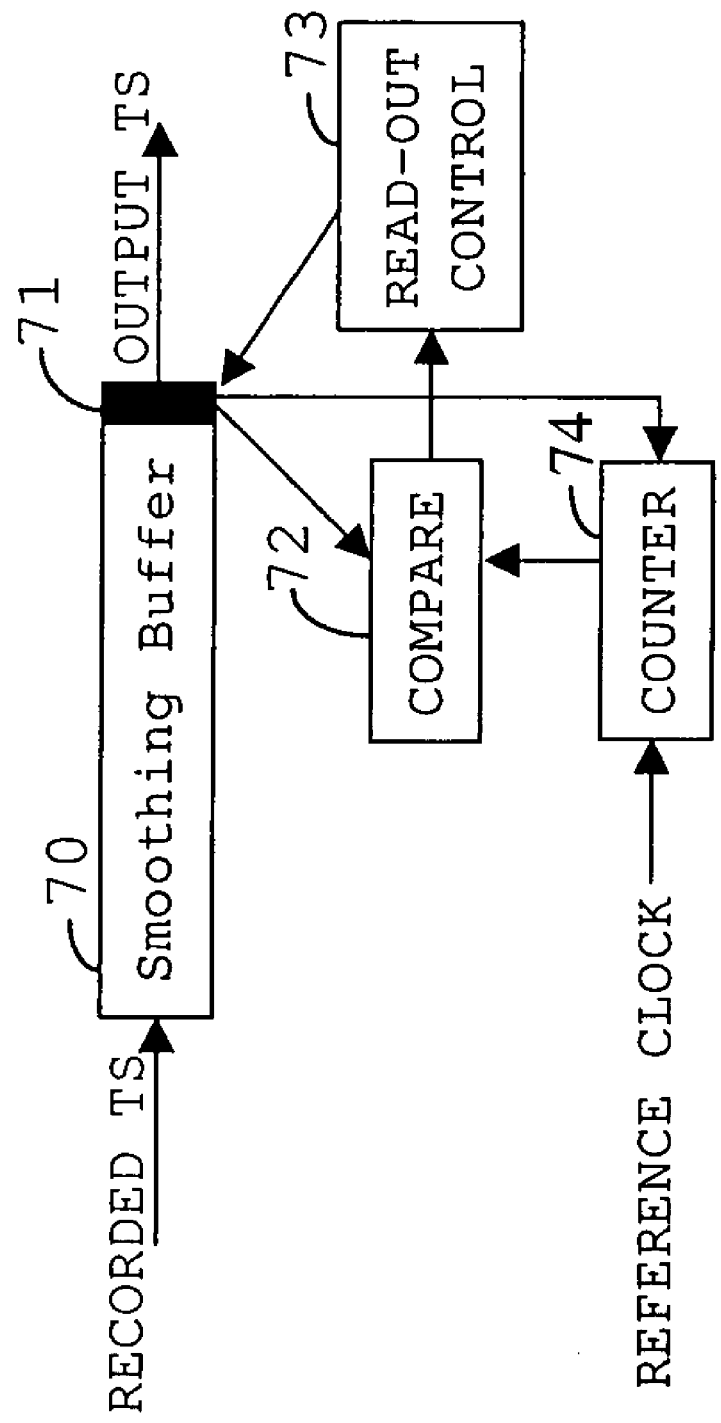
FIG. 13 is an example of a circuit for reproducing playing timing for a TS packet added with ATS.

An example of a circuit for reproducing playing timing for a TS packet added with ATS is shown in FIG. 13. Reference numeral 70 denotes a smoothing buffer, 71 denotes an ATS recorded on a smoothing buffer, 72 denotes a comparator, 73 denotes a read-out controlling part, and 74 denotes a counter.

A record TS shown in 511 $b$ is input into smoothing buffer 70. Among TS packets recorded in smoothing buffer 70, ATS 71, which is added to a TS packet recorded first, is read out and input into comparator 72. On the other hand, counter 74 operates at 27 MHz clock, the same frequency as used for generating an ATS at recording, and outputs the count to comparator 72.

When a record TS shown in 511 $b$ is played, an ATS added to a TS packet to be played first is loaded to counter 74, while the first TS packet is output. Then, comparator 72 compares a value for ATS 71 added to a following TS packet with a value from counter 74. When the values match, comparator 72 notifies read-out controlling part 73 of matching information. When the matching information is input from comparator 72, read-out controlling part 73 performs controlling so that the TS packets added with ATS 71 is read out from smoothing buffer 70 at that time. With these operations, the TS packets read out from smoothing buffer 70 are output at the same timing as an input TS (511 $a$) as shown in 511 $c$. As the part, 303-305 shown in 511 $c$, has no TS packet added with corresponding ATS, it will be blank without any data.

Effects of an ATS at usual recording and playing, i.e., when imaging frame-rate value X and playing frame-rate value Y are the same, have been described. For example, when a recording medium is memory, an address has to be specified to access there. For this reason, timing between packets cannot be stored for recording and playing if an input transport stream is used as it is. Therefore, timing between packets at input needs to be reproduced in a system such as an ATS.

Now, configuration and operations of the present invention when imaging frame-rate value X and playing frame-rate value Y are set to different values will be described. Here, it is assumed that playing frame-rate Y=(24/1.001) fps. It is also assumed that reference data-rate of MPEG2-TS at playing Rts=24 Mbps.

Figure 14:
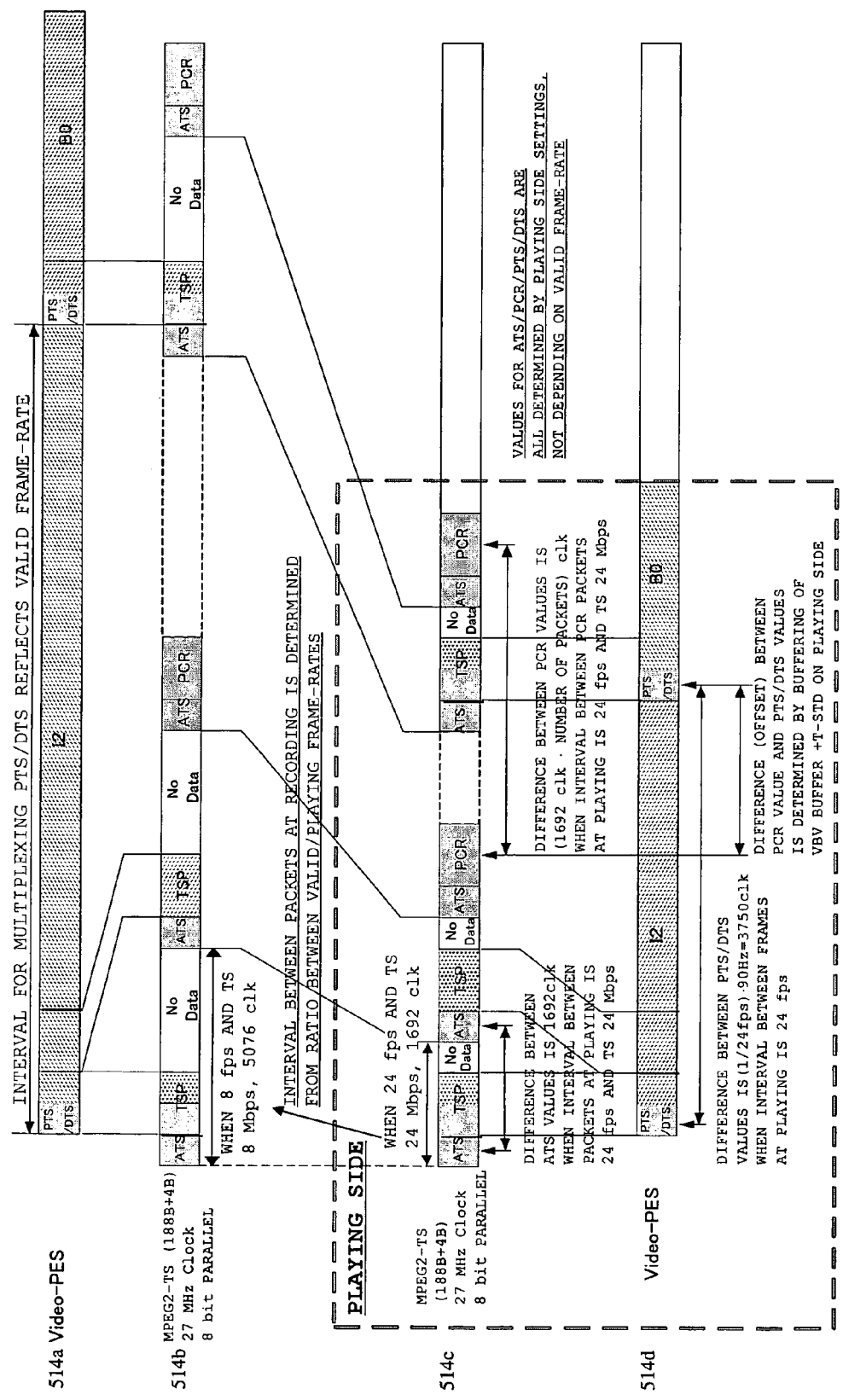
FIG. 14 is a timing chart illustrating operations of respective parts when imaging frame-rate value X=(8/1.001) fps.

FIG. 14 is a timing chart illustrating operations of respective parts when imaging frame-rate value X=(8/1.001) fps. 514 $a$ is a video PES on a recording side output from PES-making means 50. PTS/DTS is added to a video PES on a recording side by each piece of data compressing one frame of picture signals at imaging frame-rate of eight fps (valid frame-rate) Therefore, an interval for adding PTS/DTS reflects the imaging frame-rate.

514 $b$ is MPEG2-TS added with an ATS output from ATS multiplexing means 91. Data on MPEG2-TS added with an ATS output from ATS multiplexing means 91 to recording media controlling part 92 is considered to be transmitted on an eight bit parallel signal line at 27 MHz clock. A video PES shown in 514 $e$ is divided into pieces, and each piece is stored in payload of a TS packet (TSP).

A data-rate of MPEG2-TS shown in 514 $b$ is what a reference data-rate at playing Rts is multiplied by a ratio between imaging frame-rate X and playing frame-rate Y, i.e., Rts·(X/Y)=24 Mbps·(8 fps/24 fps)=8 Mbps.

Therefore, as an amount of data of MPEG2-TS is little in comparison with a transmission capacity of eight bit parallel signal line at 27 MHz clock, each interval between TS packets is blanked with no data. An interval between TS packets at recording is 188·27 MHz/(8 Mbps/8)=5076, where Rts·(X/Y)=8 Mbps.

That is to say, when the frame-rate of input picture signals is X frames/second, the preset frame-rate of a system stream at playing is Y frames/second, compressed picture data is subjected to compression encoding so that a reference data-rate at playing of the compressed picture data can be decoded at R bits/second, and a data-rate at playing of a system stream is Rts bits/second (where Rts is a real number of Rts>R), TS multiplexing part 22 performs multiplexing so that an output data-rate of a system stream is at Rts×(X/Y) bits/second as it records the system stream in recording part 23. Even if the frame-rate of input picture signals is different from the frame-rate at playing like this, TS multiplexing part 22 performs multiplexing on compressed picture data so that the compressed picture data virtually matches with a reference data-rate at playing of a system stream, corresponding to a frame-rate at playing.

An ATS is added before each TS packet. As an ATS uses a value for the arrival time of a TS packet at recording counted at 27 MHz in the usual recording and playing described above, a differential value between successive ATSs is 5076, the same as a TS packet interval at recording. However, when imaging frame-rate value X and playing frame-rate value Y are set to different values, a value added as an ATS needs to be set according to timing at playing. This will be detailed later.

514 $c$ is MPEG2-TS, which is played from a recording medium and reproduces timing of an original TS packet.

However, the timing is not exactly the same as that at recording. The data-rate is different by a ratio between an imaging frame-rate and a playing frame-rate. An ATS is primarily removed at this stage, but the embodiment is described using a drawing with an ATS remained for simplicity.

514 *d* is a video PES separated from MPEG2-TS in 514 *c*. Also in this drawing, a data-rate is different by a ratio between an imaging frame-rate and a playing frame-rate for a video PES on recording side (514 *a*).

In FIG. 14, a time reference multiplexed in a stream, i.e., values for ATS, PCR, PTS, and DTS are all provided according to a playing side, i.e., 514 *c* and 514 *d*. A differentiate value between adjacent ATSs, determined by a TS packet interval at playing as mentioned above, is 188·27 MHz/(24 Mbps/8)=1692 when Rts=2 Mbps.

That is to say, when the frame-rate of input picture signals is X frames/second and the preset frame-rate of a system stream at playing is Y frames/second, ATS value generation means 90 calculates an ATS so that the ATS is virtually X/Y times a difference between successive reference ATS values where an ATS value generated as X and Y are the same is a reference ATS value.

This ATS value generation means 90 can be configured to calculate differential value 1692 from imaging frame-rate value X, playing frame-rate value Y, and a value of reference data-rate at playing Rts by using software on a microcomputer, store the value into a register, and sequentially give a value added to each input TS packet. This will be detailed with reference to FIG. 17 later.

ATS value generation means 90 can be configured in another way to input a counter value of a counter operating at ATS reference clock as in the usual recording (27 MHz at usual recording) in ATS reference multiplexing means 90. This can be achieved with a configuration where a frequency of ATS reference clock can vary by 27 MHz·(X/Y) For example, when Y=(24/1.001) fps and X=(8/1.001) fps, a frequency of ATS reference clock is 27 MHz·(8/24)=9 MHz. As a configuration for varying an ATS reference clock, a configuration shown in FIG. 7 illustrated in the embodiment 1 according to the present invention can be used. An ATS reference clock of the embodiment 2 is an example of a clock according to the present invention.

That is to say, when the frame-rate of input picture signals is X frames/second and the preset frame-rate of a system stream at playing is Y frames/second, ATS value generation means 90 changes a frequency of ATS reference clock to X/Y times a reference value as X and Y are the same and uses the changed ATS reference clock to generate an ATS value. When a frame-rate of input picture signals and a preset frame-rate of a system stream at playing are different, ATS value generation means 90 generates an ATS value by changing a frequency of ATS reference clock from a reference value.

A differential value between adjacent PCRs, which is determined by a PCR packet at playing, is 1692·L when a PCR packet is inserted for every L packets, for example. A differential value between adjacent PTS and DTS, which is determined by a frame interval at playing, is (1/24 fps)·90 kHz=3750 when Y=24 fps. An offset value between a PCR value and a PTS/DTS value is set so as to satisfy buffering complying with the MPEG2 standard at timing of 514 *c* and 514 *d*.

As described with reference to FIG. 14, when an imaging frame-rate value X=8 fps, a playing frame-rate value Y=24 fps, and a reference data-rate at playing Rts=24 Mbps, intervals between TS packets at recording and playing are integers if counted by 27 MHz clock. Therefore, a value for an ATS can be given without problems. However, some imaging frame-rate X make an interval between TS packets at recording other than integer when it counted by 27 MHz clock. An example of this kind will be described with reference to FIG. 15.

Figure 15:
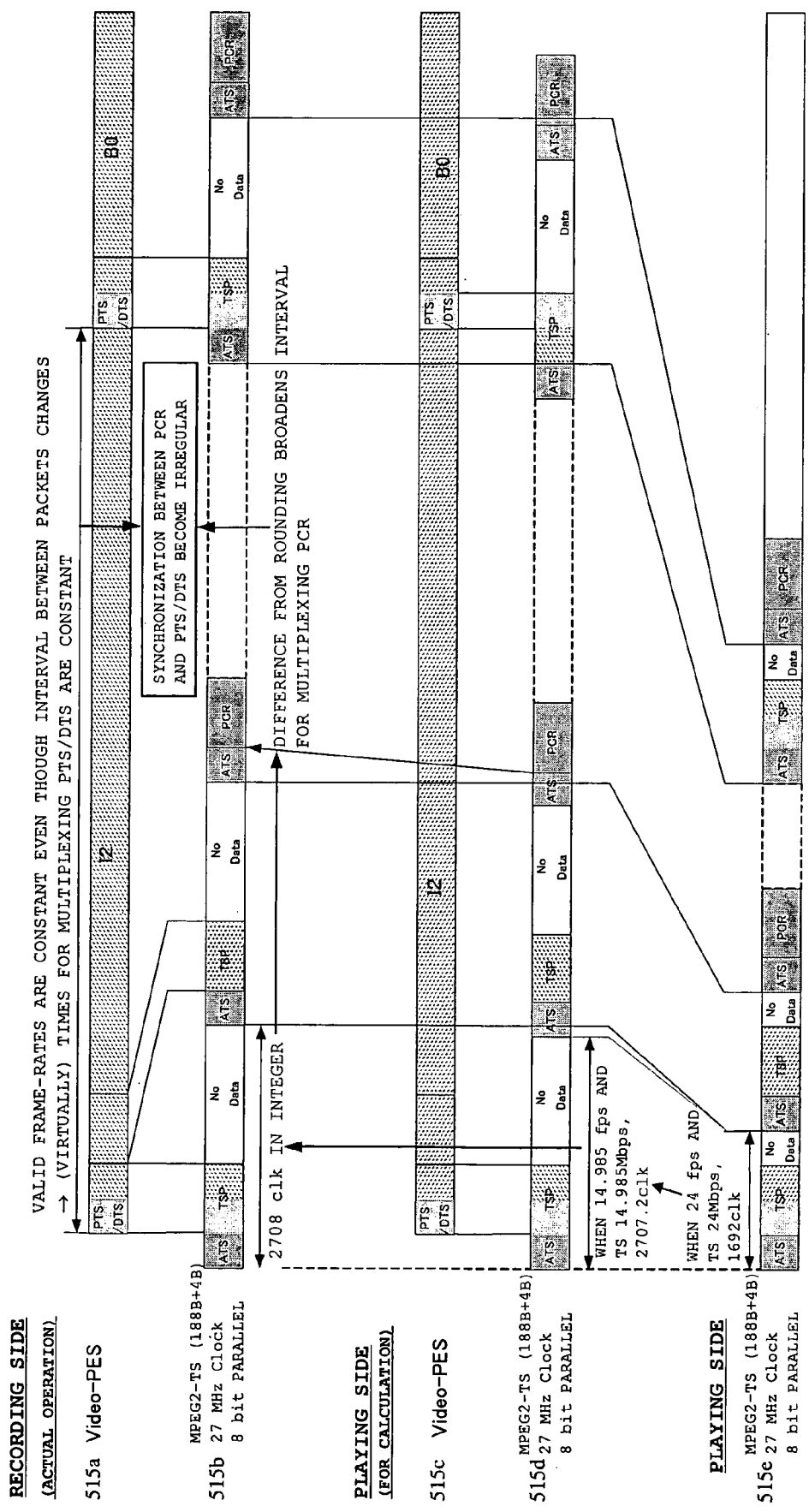
FIG. 15 is a timing chart illustrating operations of respective parts when imaging frame-rate value X=14.985 fps.

FIG. 15 is a timing chart illustrating operations of respective parts when imaging frame-rate value X=14.985 fps. 515 *e* is MPEG2-TS after played from a recording media and reproduces timing of an original TS packet, being exactly the same as 514 *c*. When timing on a recording side is calculated from 515 *e* based on a ratio between an imaging frame-rate and a playing frame-rate, MPEG2-TS added with an ATS output from ATS multiplexing means 91 is like 515 *d*, and a video PES on a recording side output from PES-making means 50 is like 515 *c*. An interval between TS packets is calculated at 515 *d* as: 188·27 MHz/(24 Mbps·(14.985 fps/24/1.001) fps)/8)=2707.2, generating a fraction.

Although an interval between TS packets actually have to be integer, if it is rounded up to 2708 clock, for example, multiple intervals of PCRs broadens for 515 *d* like 515 *b*. On the other hand, a video PES on a recording side output from PES-making means 50 is output at exactly the same timing as timing determined by an imaging frame-rate like 515 *a*, i.e., the same as 515 *c*. As a result, synchronized relationship between PCR and PTS/DTS become irregular, which cannot be correctly played as usual 24 fps picture signals at playing.

Figure 16:
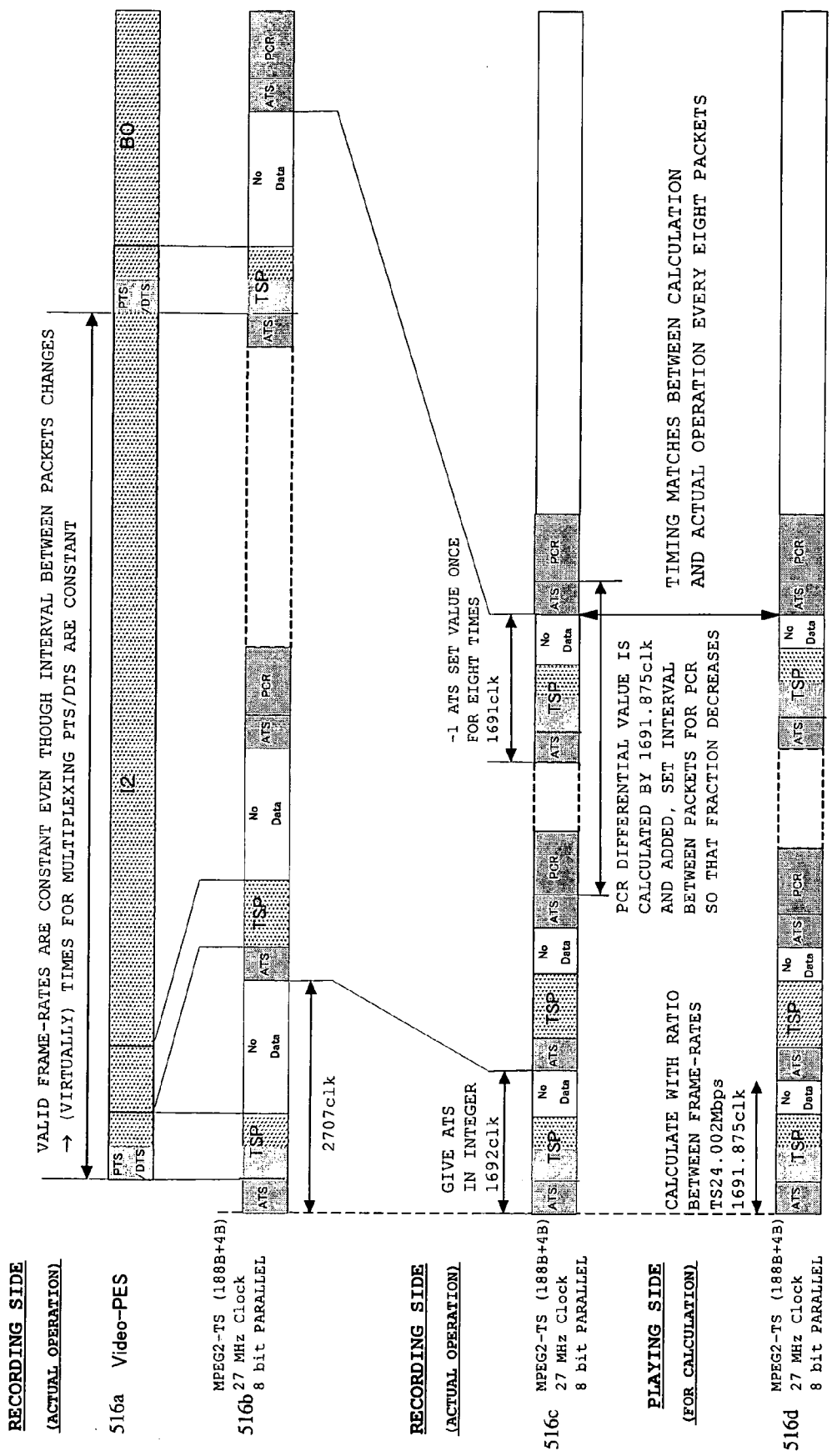
FIG. 16 is a diagram illustrating operations of respective parts when imaging frame-rate value X=14.985 fps and a fraction of an interval between TS packets is addressed.

FIG. 16 is a diagram illustrating operations of respective parts when imaging frame-rate value X=14.985 fps and a fraction of an interval between TS packets is addressed. 516 *a* is a video PES on a recording side output from PES-making means 50, being exactly the same as 515 *a*. 516 *b* is MPEG2-TS that multiplexed a video PES of 516 *a* and added with an ATS. An interval between TS packets is considered as 2707 clock here. When an interval between TS packets at playing is calculated by a ratio between imaging frame-rate and a playing frame-rate, it is 1691.875 clock as shown in 516 *d*. However, a value with such a fraction cannot be used as a differential value for an ATS.

Thus, as shown in 516 *c*, when an ATS is given assuming a differential value for successive ATSs being 1692, differences from 1691.875 are accumulated to eight packets, which is exactly for one clock. A fraction of an interval between TS packets can be addressed by making a differential value 1691 for once for eight packets when an ATS is given.

Figure 17:
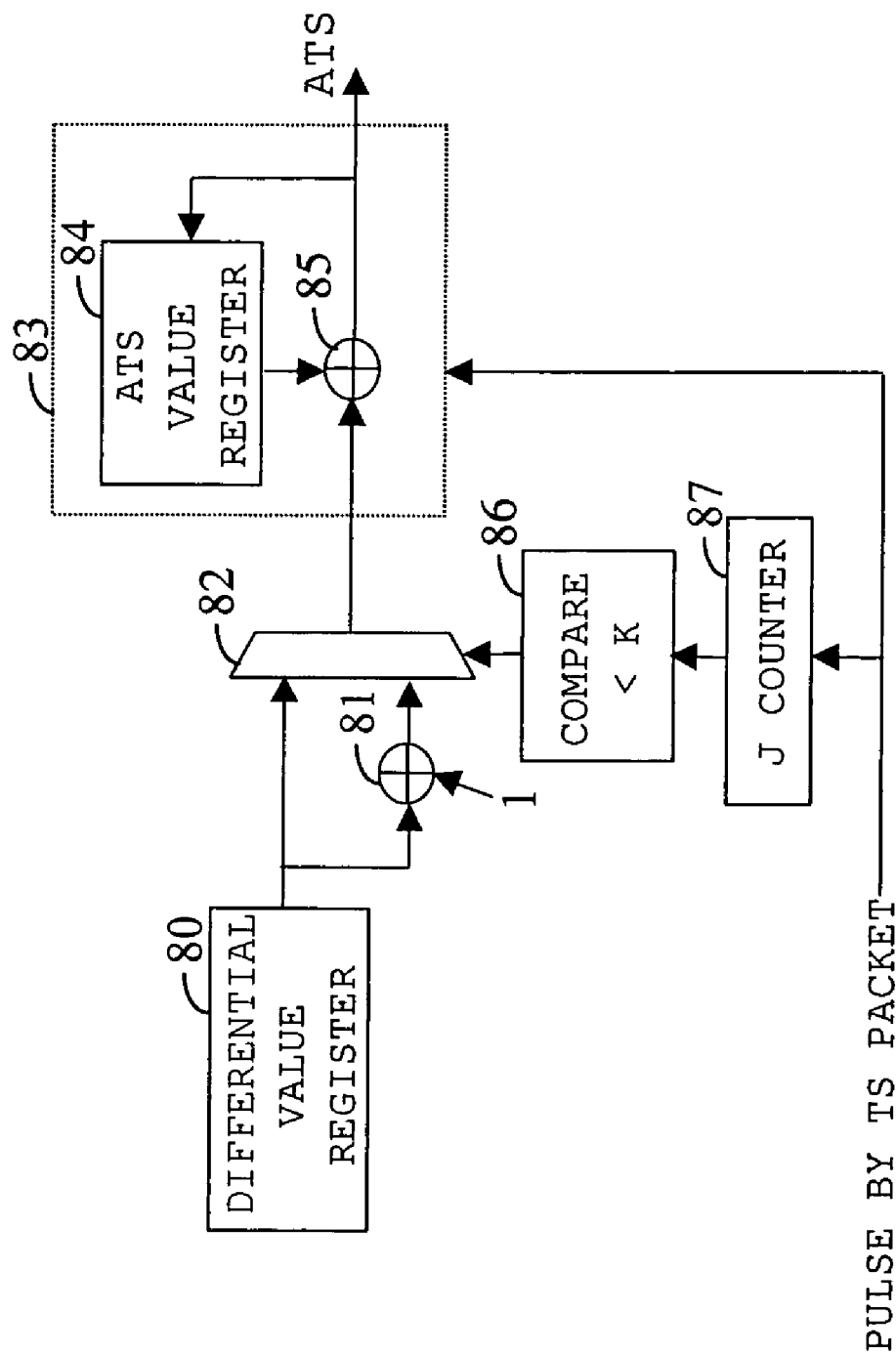
FIG. 17 is a block diagram illustrating an exemplary configuration of ATS value generation means 90.

FIG. 17 shows a configuration of ATS value generation means 90 for giving such an ATS. Reference numeral 80 denotes a differential value register, 81 denotes an adder, 82 denotes a selector, 83 denotes an ATS value counter, 84 denotes an ATS value register, 85 denotes an adder, 86 denotes a comparator, and 87 denotes a J counter that counts up to J then returns to 0. ATS value generation means 90 is configured so that each of an ATS differential value set in differential value register 80, a value J set in J counter 87, and a value K to compared with an output from J counter 87 at comparator 86 can be set from a microcomputer (not shown). When an operation corresponding to FIG. 16 is performed, 1691 is set to ATS differential value and 7 is set to each of values J and K.

ATS value counter 83 and J counter 87 are driven with a pulse synchronizing to an input of a TS packet input to ATS multiplexing means 91. J counter 87 sequentially counts up from zero each time a TS packet is input, and when it counts 7, it returns to zero when the next TS packet is input. Comparator 86 compares an output from J counter with K=7. When the output is less than K, i.e., when the output is between zero and six, selector 82 selects an output from adder 81 (1691+1=1692). When the output from J counter 87 is 7, the same as K, selector 82 selects an output from differential value register 80 (1691). Therefore, ATS counter 83 adds 1692 as a differential value for seven TS packets input among eight TS packet input and adds 1691 for one TS packet to a value stored in ATS value register 84. By using an output value from ATS counter 83 as an ATS value to be added to a TS packet, an ATS can be given at the time and a value shown in 516 *c*.

Although an ATS differential value is selected from values of 1691 and 1692 in the embodiment, the value is not limited to them and can be selected from three or more values.

Here, it is assumed that the frame-rate at recording is X and the frame-rate at playing is Y. In order to calculate an ATS differential value so that a difference of ATS values to be added to a corresponding TS packet for recording with a frame-rate as Y is X/Y times a difference of ATS values to be added to successive TS packets at recording, only an ATS needs to be calculated so that an average of selected values selected from a plurality of values as an ATS value to be added to a corresponding packet is X/Y times a difference of ATS values added to a corresponding TS packet as it is recorded at frame-rate Y. In this manner, a fraction of an interval between TS packets can be addressed.

When the frame-rate of an input picture signals and the preset frame-rate of a recorded system stream are different like this, ATS value generation means 90 multiplexes an ATS corresponding to a preset frame-rate of a system stream at playing in a TS packet.

Thus, the embodiment 2 has provided a video recording apparatus that can play at the same frame-rate (24 frames/second) and the same TS data-rate Rts as the device recorded in usual manner without requiring any special device. This is because the device enables a variable frame-rate recording even in a recording and playing system for playing TS packet timing with an ATS (Arrival Time Stamp) and performs compression encoding and multiplexing to comply with a preset playing frame-rate (24 frames/second).

The embodiments 1 and 2 have been described by using the case that a TS data-rate at playing Rts and a standard rate for compressed picture data (playing bit_rate) R are constant regardless of imaging frame-rate value (valid frame-rate) X. However, values for Rts and R need not be constant and can be changed depending on a value for X.

That is to say, when the frame-rate of input picture signals is different from the frame-rate at playing, picture encoding part 21 changes a data-rate of compressed picture data at playing, which corresponds to a frame-rate at playing, based on a frame-rate of input picture signals.

For example, in order to provide 2.5 times slow motion for 60 fps imaging as shown in FIG. 8, where a standard rate at a usual recording is 9 Mbps, the device needs to perform encoding at 22.5 Mbps, which is 2.5 times the 9 Mbps. MPEG2 MP@ML encoder can be used for a usual recording, though, encoding speed at recording 60 fps goes beyond the range of MPEG2 MP@ML, which requires a costly sophisticated encoder.

When imaging frame-rate X=60 fps and playing frame-rate Y=24 fps, encoding at recording is performed at 15 Mbps by changing a standard rate at usual recording to 6 Mbps. Thus, encoding is available within the range of MPEG2 MP@ML.

With the above operations, a variable frame-rate recording can be provided with a substantially low cost encoder in compensation for picture quality degraded by lowering standard rate R. In this case, decoding is available as typical MPEG2-TS at standard rate R=6 Mbps.

The same processing is also available in the case of recording and playing with an ATS shown in FIG. 16. That is to say, when the frame-rate of input picture signals is different from the frame-rate at playing, TS multiplexing part 22 changes a data-rate of a system stream at playing, which corresponds to a frame-rate at playing, to a frame-rate of input picture signals.

For example, when imaging frame-rate X=60 fps and playing frame-rate Y=24 fps where MPEG2-TS reference data-rate Rts for usual recording is 24 Mbps, a data-rate for MPEG2-TS at playing is 24 Mbps·(60 fps/24 fps)=60 Mbps. Even if processing at this high rate is difficult at a compression encoding part and a TS multiplexing part, this processing can be easily performed by changing to Rts=16 Mbps when X=60 fps, which makes a data-rate for MPEG2-TS at recording 16 Mbp·(60 fps/24 fps)=40 Mbps.

As mentioned above, by changing TS data-rate at playing Rts and a standard rate of compressed picture data R based on imaging frame-rate value X, a variable frame-rate recording is available with lower cost configuration.

Although the embodiments of the present invention have been described by assuming that MPEG2-TS is used for multiplexing, multiplexing methods are not limited to this and MPEG2-PS (Program Stream), for example, can be used. Although the embodiments also have been described by assuming that MPEG2 picture encoding is used for compression encoding of a picture, compression encoding methods are not limited to this and MPEG4 video encoding, H.264 video encoding, compression encoding in DVC (Digital Video Cassette), for example, can be used.

The embodiments have been described by assuming that video recording apparatus 2 is provided with valid frame retrieving part 20 and picture encoding part 21, video recording apparatus 2 is not limited to this and video recording apparatus 2 may not include valid frame retrieving part 20, picture encoding part 21, and sound encoding part 24. In this case, a device outside to video recording apparatus 2 is provided with valid frame retrieving part 20, picture encoding part 21, and sound encoding part 24. Xp picture signals 6 and valid frame flag 7 output from imaging device 1 are processed in this outside device and the device outputs compressed picture data. Then, video recording apparatus 2 inputs the compressed picture data output from the outside device into TS multiplexing part 22, which generates a system stream. Video recording apparatus 2 may not perform compression encoding on input picture signals by itself and may input compressed picture data subjected to compression encoding and only perform multiplexing.

The embodiments have been described by assuming that it multiplexes time management information defining times for decoding of PCR and the like when it records into a recording medium, though the embodiments are not limited this. When the embodiments records on a recording medium, it may record in the form of a frame-rate at recording X without multiplexing such time management information and change the picture signals recorded on the recording medium into picture signals at Y frames/second by using a frame converter or the like at playing.

That is to say, operations in this case are performed below. First, imaging device 1 that can vary a frame-rate at recording images picture signals. The picture signals imaged at picture encoding part 21 is subjected to compression encoding and the compressed picture data is output. The output compressed picture data is not processed at TS multiplexing part 22. Instead, the recording part 23 directly records the compressed picture data output from picture encoding part 21 on a recording medium. When recording part 23 records the compressed picture data on a recording medium, it records the compressed picture data at a frame-rate at imaging. When the compressed picture data recorded on the recording medium is played, the compressed picture data is converted to a predetermined frame-rate, which is previously determined by frame converter or the like.

When X is 12 and Y is 24, for example, operations continue like below. Picture signals are taken with imaging device 1 at 12 frames/second. The taken picture signals are subjected to compression encoding and compressed picture data is generated. The compressed picture data is recorded on a recording medium at 12 frames/second. Unlike the embodiments, the compressed picture data needs not to be multiplexed with time management information defining times about decoding of PCR or the like. When the compressed picture data recorded on the recording medium is played, the compressed data is converted to picture signals at 24 frames/second with a frame converter and output.

Therefore, as compressed picture data is recorded on a recording medium at a frame-rate of taken picture signals in this case, it is effective in that more recording medium can be saved compared with conventional video recording apparatus. This is because, conventional video recording apparatus records redundant compressed picture data on a recording medium, as it first converts picture signals at imaging into a frame-rate of 60 frames/second, which can be displayed on EVF, then compresses the signals within a frame and generates compressed picture data, and records the data as a picture in a frame-rate of 60 frames/second on a recording medium.

A program according to the present invention is a program cooperating with a computer for causing the computer to perform functions of all or some means of the above mentioned video recording apparatus of present invention.

A recording medium according to the present invention is a recording medium carrying a program for causing a computer to perform functions of all or some means (or device, element, etc.) of the above mentioned video recording apparatus of present invention, wherein the program readable for a computer and readout from a computer performs the functions with the computer.

The term "some means" of the present invention described above refers to one or more means among the plurality of means.

The term "functions of means" of the present invention described above refers to all or some functions among the means.

A usage of a program of the present invention can be an aspect where the program is recorded on a recording medium readable for a computer and cooperates with the computer.

A usage of a program of the present invention can be an aspect where the program is transmitted on a transmission medium, read by a computer, and cooperates with the computer.

A data structure of the present invention includes a database, a data format, a data table, a data list, a type of data.

Recording media includes ROM and transmission media includes a transmission media such as Internet, light wave, radio wave, and sound wave.

A computer of the present invention mentioned above is not limited to sheer hardware such as CPU, and can include firmware, an OS, or even a peripheral device.

As mentioned above, a configuration of the present invention can be implemented by software or hardware.

An picture recording medium of the present invention is useful as a video camera, and particularly suitable for a video camera that provides a slow motion effect and a quick motion effect in a movie not by changing the playback speed of the film but by a digital frame-rate conversion.

What is claimed is:

1. A video recording apparatus comprising:
   an encoding device operable to perform encoding of input picture signals and operable to output encoded data; and
   an inputting device operable to set (i) a playing frame-rate which is information indicating a number of frames per unit time for playing after decoding the encoded data, (ii) an imaging frame-rate which is information indicating a number of frames per unit time for imaging the picture signals, and (iii) a reference data-rate which is information indicating an amount of data per unit time for playing after decoding the encoded data; wherein
   when the imaging frame-rate is different from the playing frame-rate,
   the encoding device is operable to calculate an amount of data per unit time for encoding, based on the playing frame-rate, the imaging frame-rate, and the reference data-rate, and is operable to perform
   encoding according to an amount of data per unit time that is equal to or smaller than the calculated amount of data.

2. The video recording apparatus according to claim 1, wherein
   the encoding device is operable to calculate the amount of data per unit time for encoding, by changing the reference data-rate based on the playing frame-rate and the imaging frame-rate.

3. The video recording apparatus according to claim 2, wherein the encoding device is operable to calculate the amount of data per unit time for encoding, by multiplying the reference data-rate by a ratio of the imaging frame-rate to the playing frame-rate.

4. The video recording apparatus according to claim 1, wherein the encoding device is operable to calculate the amount of data per unit time for encoding, based on the playing frame-rate, the imaging frame-rate, and the reference data-rate that has been allowed to be smaller.

* * * * *